United States Patent
Nam et al.

(10) Patent No.: US 12,289,513 B2
(45) Date of Patent: Apr. 29, 2025

(54) POP-UP CAMERA AND DISPLAY DEVICE COMPRISING SAME

(71) Applicant: LG ELECTRONICS INC., Seoul (KR)

(72) Inventors: Sanghee Nam, Seoul (KR); Jinho Lee, Seoul (KR); Minyong Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 18/024,065

(22) PCT Filed: Sep. 4, 2020

(86) PCT No.: PCT/KR2020/011907
§ 371 (c)(1),
(2) Date: Mar. 1, 2023

(87) PCT Pub. No.: WO2022/050450
PCT Pub. Date: Mar. 10, 2022

(65) Prior Publication Data
US 2023/0269456 A1    Aug. 24, 2023

(51) Int. Cl.
*H04N 23/57* (2023.01)
*G03B 17/04* (2021.01)
*G06F 1/16* (2006.01)
*H04N 23/50* (2023.01)
*H04N 23/51* (2023.01)

(52) U.S. Cl.
CPC ............ *H04N 23/57* (2023.01); *G03B 17/04* (2013.01); *G06F 1/1686* (2013.01); *H04N 23/50* (2023.01); *H04N 23/51* (2023.01)

(58) Field of Classification Search
None
See application file for complete search history.

(56) References Cited

U.S. PATENT DOCUMENTS

2020/0213491 A1    7/2020  Huang et al.
2021/0051272 A1*   2/2021  Liu .................. H04N 23/57

FOREIGN PATENT DOCUMENTS

| CN | 107370847 A | * | 11/2017 | .......... H04M 1/0249 |
| CN | 109451111 A | * | 3/2019 | ............ H04M 1/026 |
| CN | 109525761 A | * | 3/2019 | ............ H04M 1/026 |
| CN | 109981949 A | * | 7/2019 | |
| CN | 109981951 A | * | 7/2019 | |
| CN | 110213405 A |  | 9/2019 | |

(Continued)

*Primary Examiner* — Paul M Berardesca
(74) *Attorney, Agent, or Firm* — Birch, Stewart, Kolasch & Birch, LLP

(57) ABSTRACT

A pop-up camera and a display device comprising same, according to one embodiment, are disclosed. The pop-up camera comprises: a camera module arranged so that the camera faces one side; a rail assembly into which the camera module is inserted, and which is formed such that the camera module can move upward and downward; a head assembly, which is open in the direction in which the camera faces and is arranged to cover the camera module and one side of the rail assembly coupled to the camera module so that the camera module and the rail assembly are maintained in a coupled state; and a motor assembly driven in response to an electrical signal to move the rail assembly upward and downward.

14 Claims, 16 Drawing Sheets

(a)

(b)

(56) References Cited

FOREIGN PATENT DOCUMENTS

| | | | | |
|---|---|---|---|---|
| CN | 110933208 A | * | 3/2020 | .......... H04M 1/0264 |
| CN | 111147714 A | * | 5/2020 | ........... H04N 5/2251 |
| CN | 111147717 A | * | 5/2020 | ........... H04N 5/2251 |
| CN | 111294487 A | * | 6/2020 | |
| CN | 111614872 A | * | 9/2020 | ............ H04M 1/026 |
| KR | 10-1696805 B1 | | 1/2017 | |
| KR | 10-2017-0038179 A | | 4/2017 | |
| KR | 10-1979801 B1 | | 5/2019 | |
| KR | 10-2020-0054033 A | | 5/2020 | |
| KR | 10-2108152 B1 | | 5/2020 | |

* cited by examiner (a)

(b)

(a)

(b)

POP-UP CAMERA AND DISPLAY DEVICE COMPRISING SAME

CROSS REFERENCE TO RELATED APPLICATIONS

This application is the National Phase of PCT International Application No. PCT/KR2020/011907, filed on Sep. 4, 2020, which is hereby expressly incorporated by reference into the present application.

TECHNICAL FIELD

The present disclosure relates to a pop-up camera and a display device including the same. More specifically, the present disclosure relates to a pop-up camera that is disposed inside a display device and configured to protrude from and be inserted into the display device, and a display device including the same.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Such an electronic device implemented in the form of the multimedia device requires a wider screen, and simultaneously cameras are disposed to capture front and rear sides of the electronic device.

However, as a camera is disposed on the front surface of the electronic device, a notch is generated on a front display of a display device, which spoils appearance of the display device and also causes a limitation in increasing a size of the display.

Furthermore, in the case of a pop-up camera that is disposed inside the display device and protrudes to the outside if necessary, the camera is difficult to be manufactured due to a complicated structure and many problems may occur in an assembly process as the difficulty of manufacturing increases.

DISCLOSURE OF INVENTION

Technical Problem

The present disclosure is to solve the above problems and other drawbacks, and one aspect of the present disclosure is to provide a display device which does not have a notch generated on a front display.

Another aspect of the present disclosure is to provide a pop-up camera capable of being manufactured in a display device with a low difficulty through a simplified assembly process, and a display device including the same.

Still another aspect of the present disclosure is to provide a pop-up camera capable of securing rigidity by employing several modules, and a display device including the same.

Solution to Problem

In order to achieve those aspects and other advantages, a pop-up camera that is inserted into and protrudes from a display device according to one embodiment may include a camera module disposed so that a camera is directed toward one side, a rail assembly into which the camera module is inserted and which is formed to be movable up and down, a head assembly which is open in a direction in which the camera faces and is arranged to cover the camera module and one side of the rail assembly coupled to the camera module so that the camera module and the rail assembly are maintained in a coupled state, and a motor assembly driven in response to an electrical signal to move the rail assembly upward and downward.

In one embodiment, the camera module may include the camera disposed to face the one side, a connection line having one end connected to the camera to transmit electrical signals received from the camera, and a connector connected to another end of the connection line to transmit the electrical signals to a controller. The connection line may be formed long to absorb a change in a relative distance between the camera and the connector as the rail assembly moves up and down.

In one embodiment, the camera module may be configured such that the camera is exposed to outside of a case of the display device as the rail assembly moves upward, inserted into the case of the display device as the rail assembly moves downward. The camera may be disposed to face the front of the display device when exposed to the outside, In one embodiment, the rail assembly may include a rail body including a first body having an opening open to the front and the camera of the camera module mounted thereon, and a second body extending downward from the first body and including rails formed on both sides, and a bracket fitted to the rails of the rail body and fixed to the case of the display device. The motor assembly may move the rail body upward and downward when driven by an electrical signal, and the rail body may move relative to the bracket.

In one embodiment, the second body may include a first rail and a second rail that are spaced apart from each other on both sides thereof, and the bracket may be fitted to the first rail and the second rail to guide the upward and downward movements of the rail body.

In one embodiment, the bracket may include a first plate, and a second plate disposed to be spaced apart from the first plate. Guide grooves may be formed between the first plate and the second plate, and a first protrusion and a second protrusion of the rail body may be moved with being fitted into the guide grooves.

In one embodiment, the first protrusion and the second protrusion may protrude from lower ends of the first rail and the second rail, respectively, in directions facing each other. Insertion grooves may be formed in an upper end of the second plate, and the first protrusion and the second protrusion may be inserted into the guide grooves through the insertion grooves.

In one embodiment, a fixing groove may be recessed into the bracket to be narrowed in width, and the bracket may be fixedly coupled to the case of the display device by a connection member that is inserted into the fixing groove and fixed to the case of the display device.

In one embodiment, the rail assembly may further include a spring assembly including a spring, a bushing supporting the spring, and a pin onto which the spring and the bushing are inserted. A support portion may protrude from one end of the first rail, and have an insertion hole into which one end of the pin is inserted, and an insertion groove into which another end of the pin is inserted may be formed in the first body adjacent to the first rail.

In one embodiment, the spring assembly may be configured such that the bushing is inserted into a body of the pin to be supported by a support protrusion formed adjacent to the one end of the pin, and the spring is inserted into the body of the pin to be supported by the bushing, and the spring assembly may be coupled to the rail body in a manner that the one end of the pin is inserted into the insertion hole and the another end of the pin is inserted into an inlet groove.

In one embodiment, the head assembly may be formed to cover the first body of the rail body in a state in which the spring assembly is inserted in the first body.

In one embodiment, the motor assembly may move the spring assembly up and down, and the rail body may be moved up and down as the spring presses the first body.

In one embodiment, the pop-up camera may further include a housing open in a direction in which the camera of the camera module faces, a decoration part formed to cover the opening of the housing, and a sealing member inserted into a sealing groove formed in a lower end of the housing.

In one embodiment, the sealing member may be disposed between the housing and the display case such that a lower area of the sealing member is blocked from an outer area of the display device.

In one embodiment, the housing may be received in the display device in a first state in which the rail assembly has moved downward, and may protrude to the outside of the display device in a second state in which the rail assembly has moved upward. The sealing member may be located inside the case of the display device in the second state, so that an outer space of the display device and a lower area of the housing are separated from each other in the second state.

In order to achieve those aspects and other advantages of the present disclosure, a display device according to one embodiment may include a case including a front case and a rear case coupled to the front case to define an inner space, a pop-up camera disposed in the inner space, and a controller configured to drive the pop-up camera. The pop-up camera may include a camera module in which a camera is disposed in a direction that the front case faces, a rail assembly into which the camera module is inserted, and which is configured to be movable up and down such that at least a portion of the camera module protrudes to outside of the case, a head assembly which defines one appearance of the case, and is disposed to cover one side of the rail assembly so that the camera module and the rail assembly are maintained in a coupled state, and a motor assembly driven in response to an electrical signal to move the rail assembly upward and downward.

In one embodiment, the pop-up camera may be configured to protrude to the outside, in response to an electrical signal, as a camera application is executed, and to be inserted, in response to an electrical signal, as the camera application is terminated.

In one embodiment, the case may further include a connection member disposed on at least one of the front case or the rear case and protruding in one direction. The rail assembly may include a rail body including a first body having the camera mounted thereon, a second body extending from the first body and including rails formed on both sides, and a bracket fitted to the rails of the rail body and fixed to the case of the display device. A fixing groove may be recessed into the bracket to be narrowed in width. The bracket may be fixed to the case as the connection member is coupled into the fixing groove.

Advantageous Effects of Invention

According to the present disclosure, since a pop-up camera is disposed inside a display device and protrudes from the display device when necessary, a size of a notch that may be generated on a front surface of the display device can be minimized although a front camera is disposed, or a display without a notch can be implemented.

According to the present disclosure, a housing and a rail assembly can be configured as different modules. Accordingly, various exterior performances required in the housing can be implemented. In addition, rigidity of the modules can be secured by a coupling structure of adhesives, insertion protrusions and respective coupling holes of the housing and rail body.

According to the present disclosure, a sealing member does not protrude to outside of a case of the display device. This can effectively prevent introduction of foreign substances and moisture penetration, which may occur while the pop-up camera is inserted into and drawn out of the display device.

According to the present disclosure, although a rail assembly and a bracket are configured as different modules from each other, the bracket can be firmly fixed to the display device and the rail assembly can be stably coupled to the bracket. This is advantageous in that relative switching of the pop-up camera from a first state to a second state can be stably made.

According to the present disclosure, in order to transmit driving force of a motor to the rail body, a simple fitting structure can be applied to a pin of a spring assembly, such that power can be transmitted through a very simple structure. This is realized as the pop-up camera is modularized into the rail body, the bracket, the spring assembly, and the housing, and provides an advantage that the pop-up camera can be assembled quickly and easily through such modularization and simple assembling structure.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
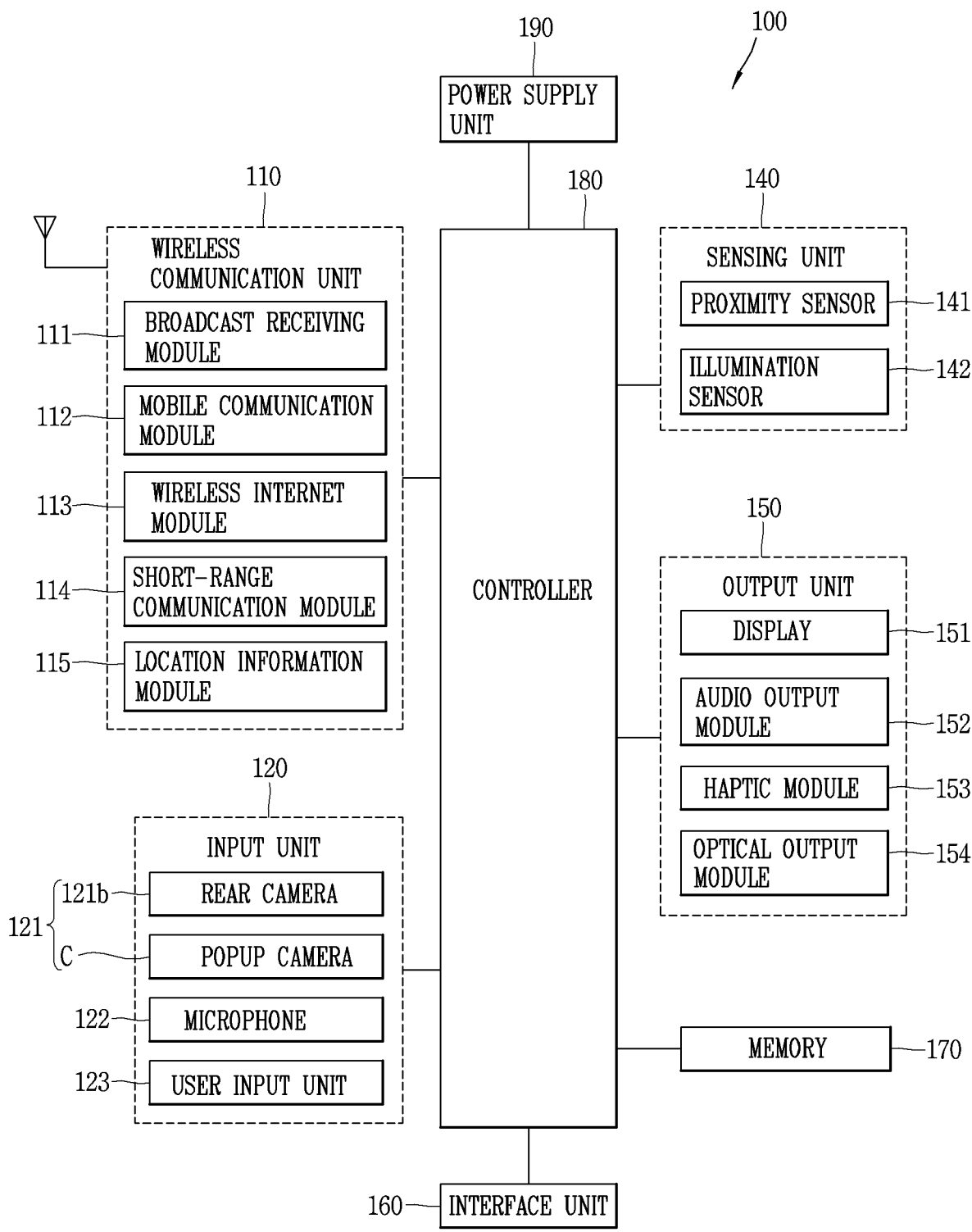
FIG. 1 is a view illustrating a detailed configuration of a display device in accordance with one implementation of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation unless it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Figure 2:
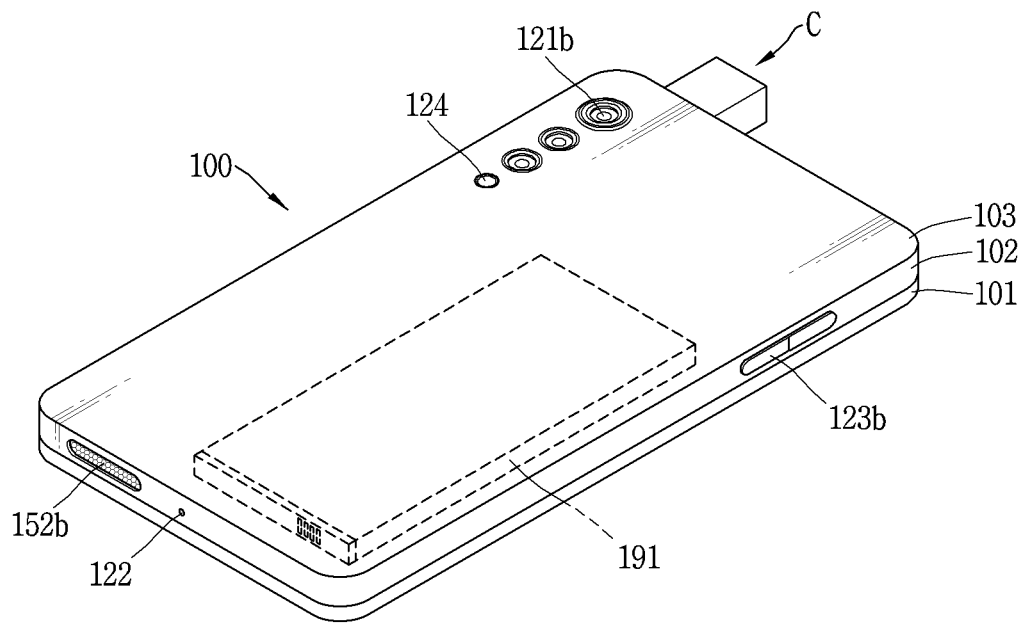
FIG. 2 is a conceptual view illustrating one example of a display device related to the present disclosure, viewed from different directions.
Figure 2:
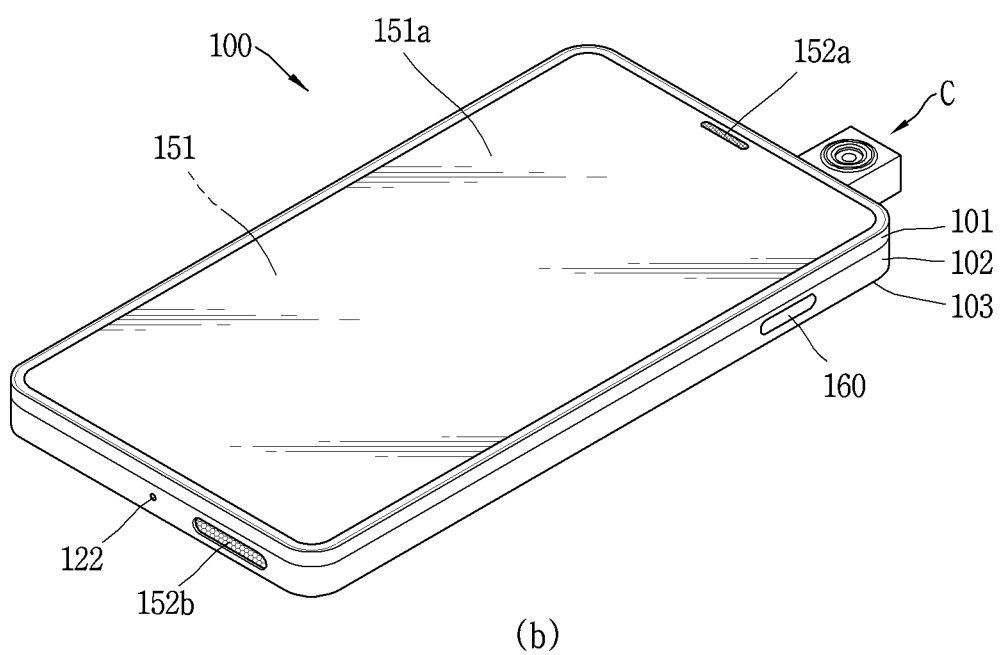

FIG. 1 is a view illustrating a detailed configuration of a display device in accordance with one implementation of the present disclosure. FIG. 2 is a conceptual view illustrating one example of a display device related to the present disclosure, viewed from different directions.

Flexible display devices presented herein may be implemented using a variety of different types of terminals. Examples of such devices include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals. Hereinafter, for convenience of description, in this specification, a mobile terminal will be described as an example of a flexible display device.

FIG. 1 is a block diagram illustrating a mobile terminal in accordance with the present disclosure.

The mobile terminal (flexible display device) 100 may include components, such as a wireless communication unit 110, an input unit 120, a sensing unit 140, an output unit 150, an interface unit 160, a memory 170, a controller 180, a power supply unit 190 and the like. The components shown in FIG. 1A are not essential for implementing a mobile terminal, and thus the mobile terminal described herein may have more or fewer components than those listed above.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel, a terrestrial channel, or both. At least two broadcast receiving modules 111 may be provided in the mobile terminal 100 to simultaneously receive at least two broadcast channels or switch the broadcast channels.

The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may include a camera 121 or an image input unit for obtaining images or video, a microphone 122, which is one type of audio (voice) input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

Such cameras 121 may process image frames of still pictures or video obtained by image sensors in a video or image capture mode. The processed image frames may be displayed on the flexible display 151. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The plurality of cameras 121 may include a rear camera 121b disposed on the rear surface, and a pop-up camera C disposed inside the display device and capable of protruding outward to capture a front side.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. When information is input through the user input unit 123, the controller 180 may control an operation of the mobile terminal 100 to correspond to the input information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 may control an operation of the mobile terminal 100 or execute data processing, a function or an operation associated with an application program installed in the mobile terminal based on the sensing signal. The sensing unit 140 may be implemented using any of a variety of sensors, some of which will now be described in more detail.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). On the other hand, the mobile terminal disclosed herein may use information in such a manner of combining information sensed by at least two sensors of those sensors.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may be configured to detect a position, an area where a touch object applying a touch onto the touch screen is touched on the touch sensor, a pressure at the time of touch, a capacitance at the time of touch, and the like. A touch object is generally used to apply a touch input to the touch sensor. Examples of typical touch objects include a finger, a touch pen, a stylus pen, a pointer, or the like.

When a touch input is sensed by a touch sensor, a signal(s) corresponding to the touch input is transmitted to a touch controller. The touch controller may process the received signals, and then transmit corresponding data to the controller 180. Accordingly, the controller 180 may sense which region of the flexible display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

Also, the controller 180 may be a processor that drives various applications executed on the flexible display device. For example, the controller 180 may execute various applications including a camera application that is executed on the flexible display device.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The flexible display 151 may display (output) information processed in the mobile terminal 100. For example, the flexible display 151 may display execution screen information of an application program driven in the mobile terminal 100 or user interface (UI) and graphic user interface (GUI) information in response to the execution screen information.

Furthermore, the flexible display 151 may be implemented as a stereoscopic display for displaying stereoscopic images.

The stereoscopic display may employ a three-dimensional display type, such as a stereoscopic type (a glasses type), an auto-stereoscopic type (a glassless type), a projection type (a holographic type), or the like.

The output unit 150 may be configured to output an audio signal, a video signal or a tactile signal. The output unit 150 may include a flexible display 151, an audio output module 152, a haptic module 153, an optical output unit 154 and the like. The flexible display 151 may have an inter-layered structure or an integrated structure with a touch sensor in order to facilitate a touch screen. The touch screen may function as the user input unit 123 which provides an input interface between the mobile terminal 100 and the user and simultaneously provide an output interface between the mobile terminal 100 and a user.

The audio output module 152 may receive audio data from the wireless communication unit 110 or output audio data stored in the memory 170 in modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 may serve as an interface with various types of external devices connected with the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions related to a connected external device, in response to the external device being connected to the interface unit 160.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Such various command signals received from the cradle or the power may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 typically controls an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100 under the control of the controller 180. The power supply unit 190 may include a battery 191, and the battery may be configured to be embedded in the terminal body, or configured to be detachable from the terminal body.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, embodiments related to a display device will be described with reference to the accompanying drawings. It will be apparent to those skilled in the art that the present disclosure may be embodied in other specific forms without departing from the spirit or essential characteristics thereof.

Figure 3:
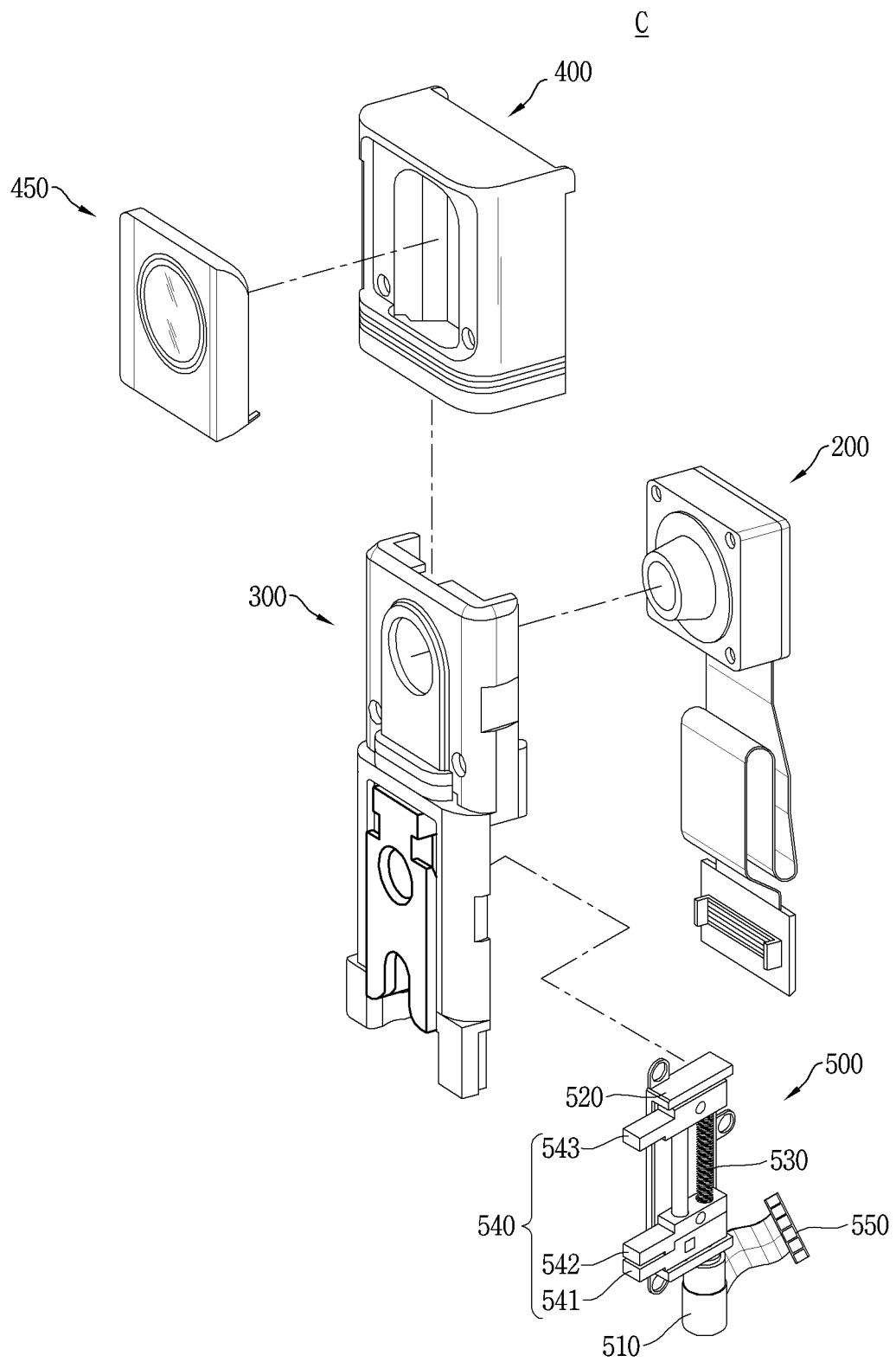
FIG. 3 is an exploded perspective view illustrating a pop-up camera in accordance with one embodiment of the present disclosure.
Figure 4:
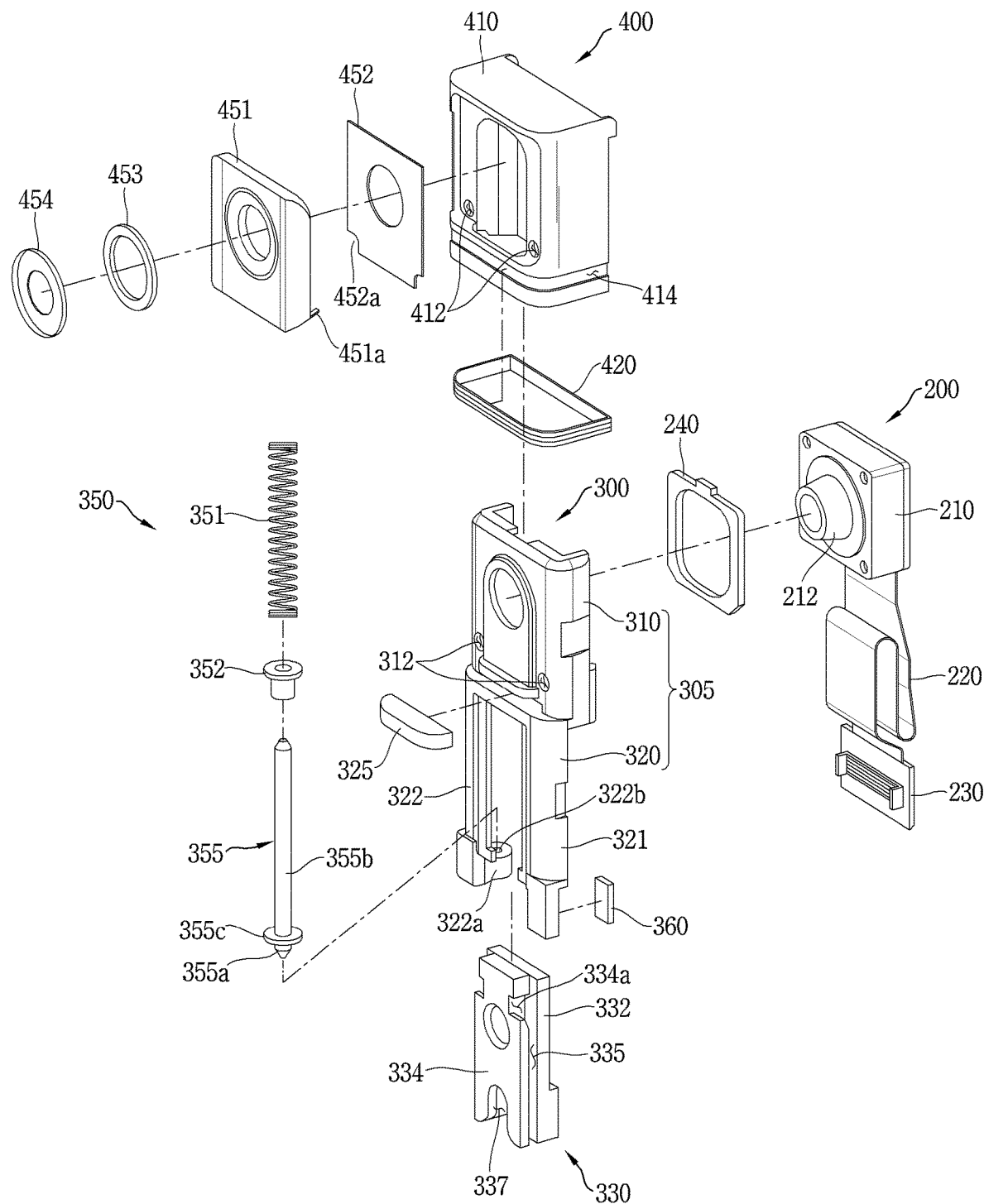
FIG. 4 is an exploded perspective view illustrating the pop-up camera of FIG. 3 in more detail.
Figure 5:
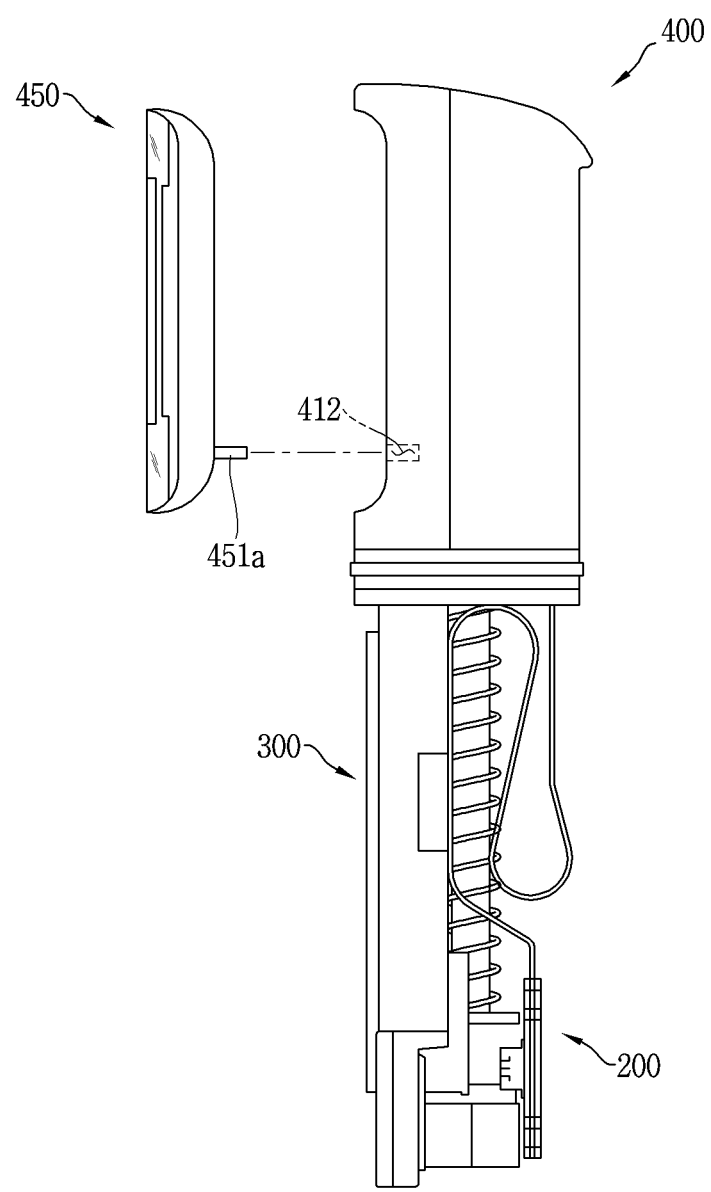
FIG. 5 is a lateral view illustrating a state in which components of the pop-up camera of FIG. 3, except for a motor assembly, are coupled, viewed from the side.

FIG. 3 is an exploded perspective view illustrating a pop-up camera in accordance with one embodiment of the present disclosure. FIG. 4 is an exploded perspective view illustrating the pop-up camera of FIG. 3 in more detail. FIG. 5 is a lateral view illustrating a state in which components of the pop-up camera of FIG. 3, except for a motor assembly, are coupled, viewed from the side.

As described above, a display device according to one embodiment of the present disclosure may include a front case 101 and a rear case 102 coupled to the front case 101 to define an inner space. The front case 101 and the rear case 102 may be coupled to define a case. The case may further include a rear cover 103.

A pop-up camera C is disposed in the inner space of the case.

Figure 7:
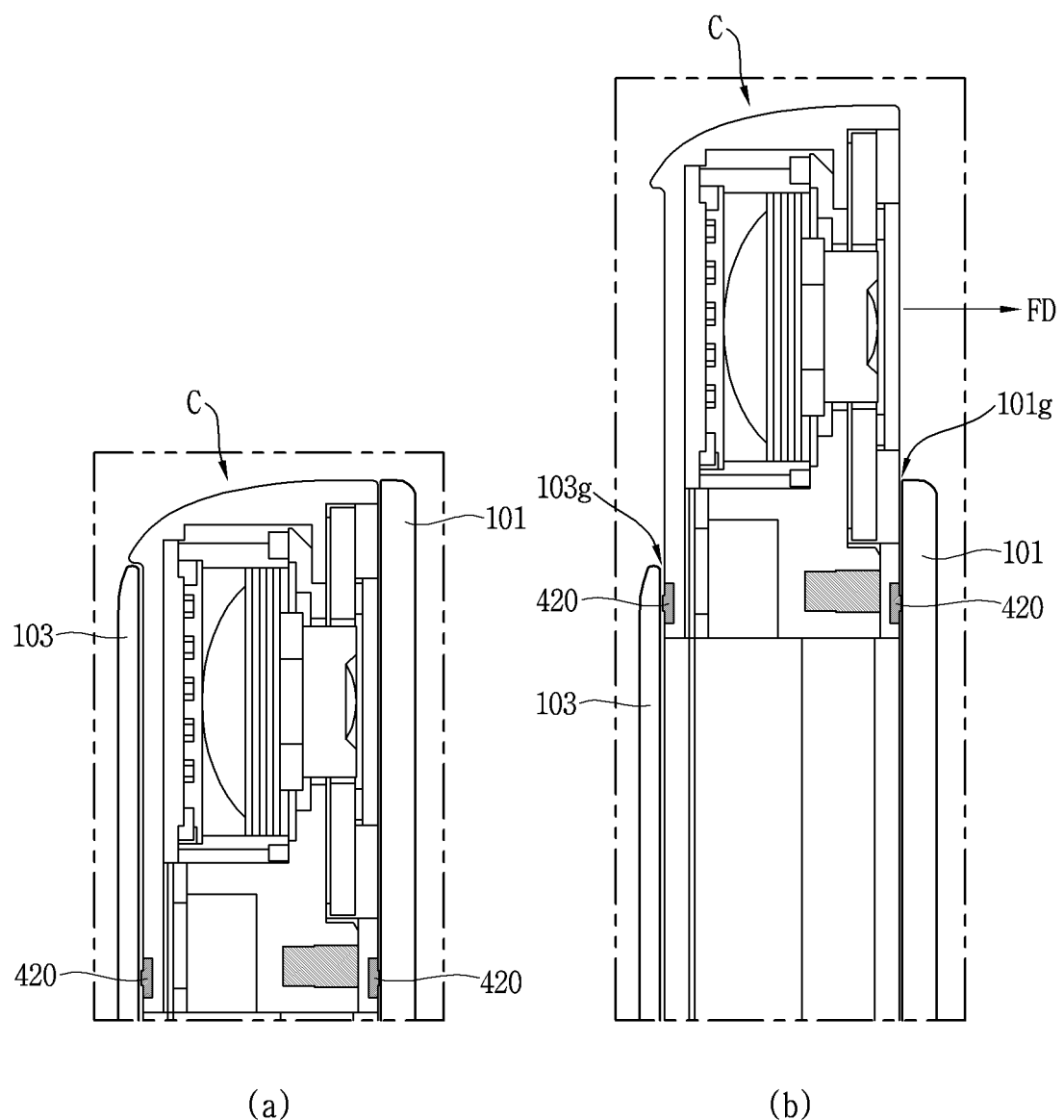
FIG. 7 is a conceptual view illustrating the states in which the pop-up camera according to FIGS. 6A and 6B is disposed in the display device.

The pop-up camera C may realize a first state of being drawn into the case of the display device and a second state of protruding to the outside of the case of the display device. Specifically, (a) of FIG. 7 illustrates that the pop-up camera C is inserted between the front case 101 and the rear cover 103 which define the case of the display device, and (b) of FIG. 7 illustrates that the pop-up camera C protrudes to the outside of the case of the display device.

The controller generates an electrical signal to activate the pop-up camera C. Specifically, the controller may transmit an electrical signal to a motor assembly 500 to be described later so that the pop-up camera C protrudes to the outside of the case or is inserted into the case.

The pop-up camera C may include a camera module 200, a rail assembly 300, a head assembly 400, and a motor assembly 500.

Configuration and Description of Camera Module 200

In the camera module 200, as the rail assembly 300 moves upward, the camera 212 may be exposed to the outside of the case of the display device, and as the rail assembly 300 moves downward, the camera 212 may be inserted into the case of the display device. When the camera 121 is exposed externally, it may be exposed to face the front of the display device.

The camera module 200 is inserted into the rail assembly 300, and the rail assembly 200 is movable up and down such that at least a portion of the camera module 200 protrudes to the outside of the case.

The head assembly 400 defines one exterior of the case. Also, the head assembly 400 is disposed to cover one side of the rail assembly 300 so that the camera module 200 and the rail assembly 300 are maintained in a coupled state. This will be described later in detail.

The motor assembly 500 is driven according to a signal from the controller such that the rail assembly 300 moves upward and downward.

Hereinafter, the camera module 200, the rail assembly 300, the head assembly 400, and the motor assembly 500 will be described in detail.

The camera module 200 may include a camera 212, a connection line 220, and a connector 230.

The camera 212 may be disposed to face one side. As described above, the present disclosure is to minimize a size of a notch that may be generated on a front surface of the display device or implement a display without a notch. Therefore, the camera 212 may be disposed in a direction that the display faces. That is, the camera 212 may be disposed in a direction that the front case 101 faces. When the pop-up camera C protrudes, the camera module 200 may perform a function that has been performed by the existing front camera 212 of the display device.

Meanwhile, a camera body 210 surrounding the camera 212 may be formed. The camera body 210 may have a volume that is large enough for the camera 212 to be stably mounted in the rail assembly 300. In addition, a camera pad 240 may be disposed between the camera body 210 and the rail assembly 300 to prevent the camera 212 from being damaged by pressure.

The connection line 220 may have one end connected to the camera 212 and another end connected to the connector 230. The connection line 220 may transmit electrical signals related to images received from the camera 212 to the controller through the connector 230. The connector 230 may be connected to another connector 230 included in the display device to transmit an image signal received from the camera 212 to the controller.

The connection line 220 may be formed long to absorb a change in a relative distance between the camera 212 and the connector 230 as the rail assembly 300 moves up and down. That is, since the connector 230 is fixedly connected to electronic components inside the display device and the camera 212 moves up and down, the connection line 220 may be formed long so as to stably connect the camera 212 and the connector 230 even when the camera 212 and the connector 230 have the maximum distance therebetween. Specifically, as illustrated in FIG. 4, the connection line 220 may be formed long and may be foldable when the pop-up camera C is in the first state.

Configuration and Description of Rail Assembly 300

The rail assembly 300 may include a rail body 305, a bracket 330, and a spring assembly 350.

The rail body 305 may include a first body 310 and a second body 320.

The first body 310 may include an opening formed through its front surface, and define a space in which the camera 212 of the camera module 200 is received. Specifically, the first body 310 may include an opening through which the camera 212 can pass. Also, the first body 310 may be open at one side such that the camera body 210 can be inserted and seated and formed to surround the camera body 210. Meanwhile, coupling holes 312 may be formed through a front surface of the first body 310, such that insertion protrusions 451a formed on a decoration mold 451 of a decoration part 450 to be explained later can be inserted.

The second body 320 extends downward from the first body 310. The second body 320 may include a first rail 321 and a second rail 322 extending from both sides of a lower end of the first body 310. The first rail 321 and the second rail 322 are spaced apart from each other.

The first rail 321 and the second rail 322 may include a first guide rail 321g and a second guide rail 322g protruding toward each other.

Figure 9:
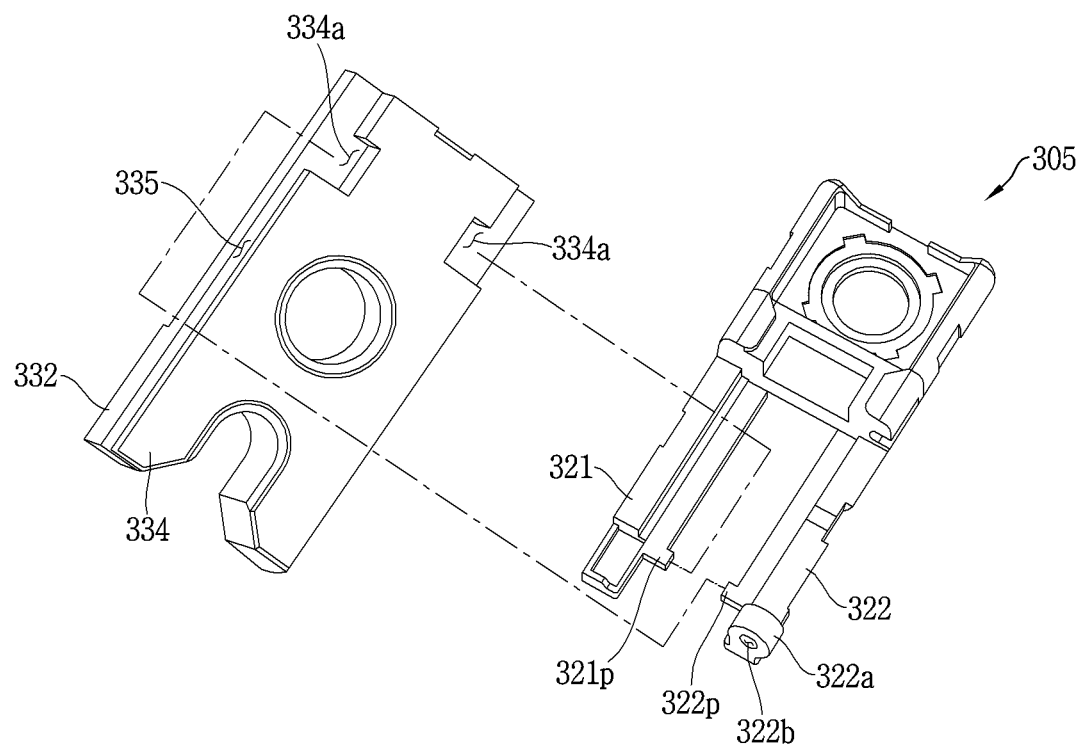
FIG. 9 is a conceptual view illustrating that a bracket and a rail body of a pop-up camera according to one embodiment of the present disclosure are coupled to each other.
Figure 10A:
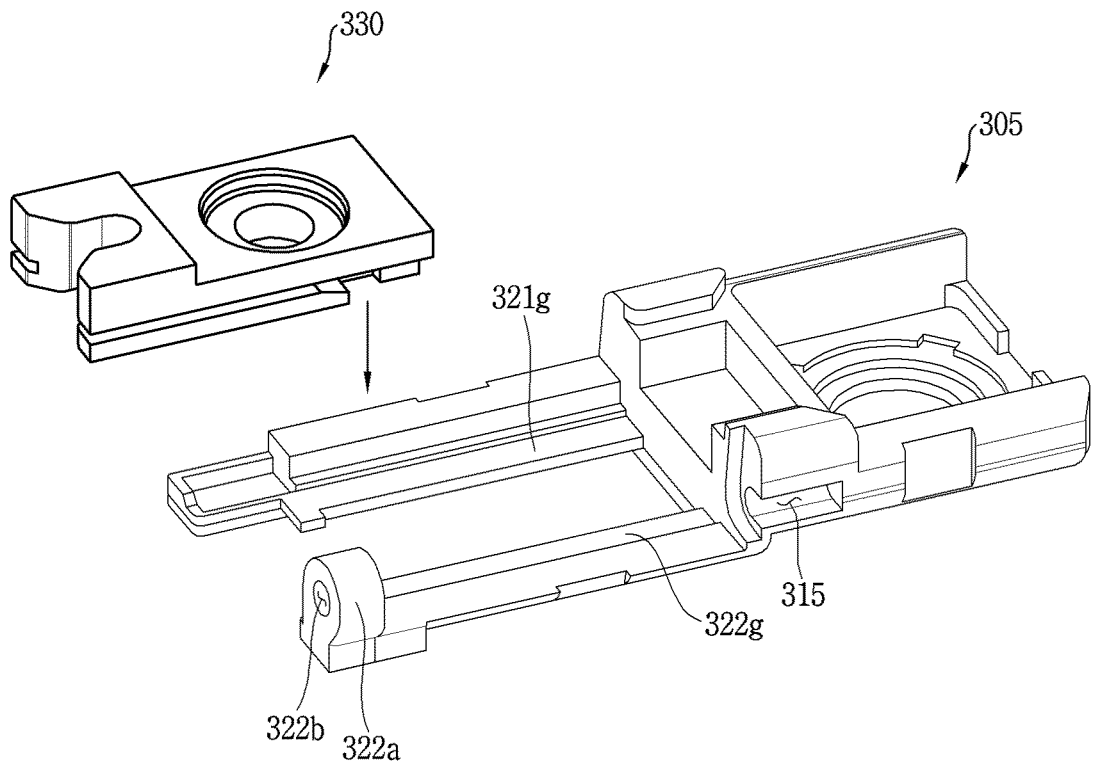
FIGS. 10A to 10F are conceptual views illustrating processes of assembling and operating a rail assembly of a pop-up camera according to one embodiment of the present disclosure.

Specifically, as illustrated in FIGS. 4 and 10A, the first rail 321 and the second rail 322 may protrude toward each other and may include a first guide rail 321g and a second guide rail 321g, respectively, that extend in a longitudinal direction. That is, the first guide rail 321g and the second guide rail 322g may be inserted into insertion grooves 334a of a bracket 330 (see FIG. 9) to serve as guides along which the rail body 305 can move.

A first protrusion 321p and a second protrusion 322p may be formed on end portions of the first guide rail 321g and the second guide rail 322g of the first rail 321 and the second rail 322, respectively.

Specifically, referring to FIGS. 9 and 10, the first protrusion 321p and the second protrusion 322p may protrude from the ends of the first rail 321 and the second rail 322, respectively, to face each other. The first protrusion 321p and the second protrusion 322p are moved while being fitted to guide grooves 335 of the bracket 330 to be described later.

A magnet 360 may be attached to a lower end of the second rail 322. The magnet 360 may be adjacent to or spaced apart from a hall sensor, which is disposed inside the display device, as the pop-up camera C is disposed in the first and second states.

When the magnet 360 is adjacent to the hall sensor disposed inside the display device, the controller may detect that the pop-up camera C is in the first state. And, when the magnet 360 is spaced apart from the hall sensor of the display device, the controller may detect that the pop-up camera C is in the second state.

While the rail body 305 moves up and down, the first protrusion 321p and the second protrusion 322p may move inside the guide grooves 335. Accordingly, the rail body 305 can be fixed so as to be prevented from being separated from the bracket 330.

Meanwhile, referring to FIG. 4, the rail assembly 300 may further include a spring assembly 350 that includes a spring 351, a bushing 352 supporting the spring 351, and a pin 355 into which the spring 351 and the bushing 352 are inserted.

The bushing 352 of the spring assembly 350 is inserted onto a pin body 355b so as to be supported by a support protrusion 355c formed adjacent to one end 355a of the pin. In addition, the spring 351 may be inserted onto the pin body 355b so that one end thereof is supported by the bushing 352 inserted onto the pin.

Meanwhile, a support portion 322a may protrude from one end of the first rail 321, and an insertion hole 322b into which the one end 355a of the pin is inserted may be formed in the support portion 322a. An inlet groove 315 into which another end of the pin is inserted may be formed in the first body 310 adjacent to the first rail 321. Also, the another end of the pin may be inserted into the inlet groove 315 of the first body 310. This will be described later in detail with reference to FIGS. 10A to 10F.

The bracket 330 is fitted to rails, which includes the first guide rail 321g and the second guide rail 322g of the rail body 305 to guide the first guide rail 321g and the second guide rail 322g. Also, the bracket 330 may be fixed to the case of the display device.

The bracket 330 may include a first plate 332, and a second plate 334 spaced apart from the first plate 332. In this case, the guide grooves 335 that are concavely recessed may be formed between the first plate 332 and the second plate 334.

The insertion grooves 334a may be formed in an upper end of the second plate 334. The insertion grooves 334a may be recessed inwardly so that the first protrusion 321p and the second protrusion 322p can be inserted. Also, the first protrusion 321p and the second protrusion 322p of the rail body 305 may be moved with being fitted to the guide grooves 335 to be movable.

The bracket 330 may be provided with a fixing groove 337 that is recessed to be narrowed in width. Specifically, as illustrated in FIG. 4, the fixing groove 337 may be recessed at an opposite side at which the bracket 330 is coupled to the rail body 305.

Also, the case of the display device may include a connection member 108 inserted into the fixing groove 337 of the bracket 330. Specifically, the connection member 108 may be fixed to the case of the display device and may have a shape protruding to one side.

The connection member 108 may be fixed to the front case 101, and then inserted into the fixing groove 337 of the bracket 330 to fix the bracket 330. As the connection member 108 is inserted into the fixing groove 337, the bracket 330 is restricted from rotating or moving up and down. Accordingly, the bracket 330 can be fixedly coupled to the case of the display device by the connection member 108 inserted into the fixing groove 337.

Since the bracket 330 is fixed to the case of the display device by the connection member 108 inserted therein, a stable movement of the rail body 305 can be secure while the rail body 305 moves relative to the bracket 330.

Configuration and Description of Head Assembly 400

The head assembly 400 may include a housing 410, a decoration part 450, and a sealing member 420.

The housing 410 may be open in a direction that the camera 212 of the camera module 200 faces. The decoration part 450 may be coupled to a front surface of the housing 410. A rear surface of the housing 410 may be closed. The rail assembly 300 may be coupled to a lower surface of the housing 410. Specifically, the housing 410 may cover an upper side of the rail assembly 300 to which the camera module 200, the rail body 305, the bracket 330, and the spring assembly 350 are coupled.

The decoration part 450 may be formed to cover an opening open through the front surface of the housing 410. The decoration part 450 may be adhered to a decoration mold 451 by a first adhesive 452. A second adhesive 453 may be disposed on a front surface of the decoration mold 451 such that a decoration window 454 is coupled to the decoration mold 451.

The decoration part 450 may be provided with insertion protrusions 451a that are inserted into coupling holes 412 formed in the front surface of the housing 410. Specifically, referring to FIGS. 4 and 5, the insertion protrusions 451a of the decoration part 450 are inserted into the coupling holes of the housing 410, and the rail body 305 is inserted into the housing 410. Therefore, the insertion protrusions 451a of the decoration part 450 may also be inserted into the coupling holes 312 of the rail body 305. In order to insert the insertion protrusions 451a into the coupling holes 412, the first adhesive 452 may have recesses 452a.

The decoration part 450 can not only be coupled to the housing 410 by the insertion protrusions 451a, but also firmly couple the housing 410 and the rail body 305 to each other. That is, although the pop-up camera C according to the one embodiment of the present disclosure is configured by several modules, such a structure can have an advantage in that those modules can be firmly coupled by the adhesives and the insertion protrusions 451a.

In the pop-up camera C and the display device according to the one embodiment of the present disclosure, the rail assembly 300 and the head assembly 400 can be configured as different modules, so as to diversify appearance of the head assembly 400.

Specifically, the rail assembly 300 and/or the bracket 330 may be made of a polyoxymethylene (POM) material to secure self-lubricating properties for repeated vertical movement and thus reduce friction. This can minimize wear resistance and friction coefficient of the rail assembly 300 and/or the bracket 330 against friction.

However, such a POM material may be difficult to meet various appearance requirements of the display device or the pop-up camera C.

Specifically, the pop-up camera C may define one appearance of the display device. Referring to FIG. 7, in a first state in which the pop-up camera C is inserted into the display device, the upper surface of the housing 410 defines one appearance of the display device. Even in a state in which the pop-up camera C protrudes to the outside of the display device, the exposed surfaces of the housing 410 may define the appearance of the display device.

In this case, when the housing 410 and the rail body 305 and/or the rail assembly 300 are made of the same material through single or double injection, it may be difficult to implement various shapes, for example, bright colors and textures, which are required for the appearance of the display device, by using the material for minimizing the wear resistance and friction coefficient.

In the pop-up camera C and the display device according to the one embodiment of the present disclosure, the housing 410 and the rail assembly 300 can be configured as different modules. Accordingly, various exterior performances required in the housing 410 can be implemented. In addition, as described above, the rigidity of the modules can be secured by the coupling structure of the adhesives, the insertion protrusions 451a, and the respective coupling holes of the housing 410 and the rail body 305.

On the other hand, a sealing groove 414 may be formed concavely in a lower end of the housing 410 and a sealing member 420 may further be provided to be inserted into the sealing groove 414. That is, the housing 410 and the sealing member 420 may be configured separately from each other.

The sealing member 420 is fitted into the sealing groove 414 to reduce separation from the housing 410. In addition, the sealing member 420 is movable while coming in contact with the case of the display device, as will be described later, and does not protrude to the outside of the case of the display device, which can effectively prevent introduction of foreign substances and dust and moisture penetration, which may occur while the pop-up camera C is inserted into and drawn out of the display device.

Meanwhile, a sealing cap 325 may be further provided on the front of the rail body 305. The sealing cap 325 can prevent once again foreign substances, dust, and moisture, which have not been blocked by the sealing member 420, from penetrating into the display device.

Configuration and Description of Motor Assembly 500

When driven by an electrical signal, the motor assembly 500 allows the rail body 305 to move up and down, and the rail body 305 moves relative to the bracket 330.

The motor assembly 500 includes a motor 510 driven by a signal, a motor assembly body 520, a screw shaft 530, a plurality of moving rods 540, and a connection part 550. As the motor 510 is driven, a first moving rod 541 and the second moving rod 542 may move. As the moving rods 540 move, the spring assembly 350 and the rail body 305 may move upward or downward. This will be described in detail with reference to FIG. 6A and subsequent drawings.

The pop-up camera C and the display device including the same according to the one embodiment of the present disclosure have an advantage of securing rigidity not only by modularizing respective components constituting the pop-up camera C but also by various coupling structures, such as fitting the bracket 330 and the rail body 305 into grooves, coupling the housing 410 and the rail body 305 through the insertion protrusions 451a, using the adhesives, and the like. Furthermore, since those modules are manufactured separately, complex shapes can be reduced, processing costs can be reduced, and freedom of design can be increased.

Figure 6A:
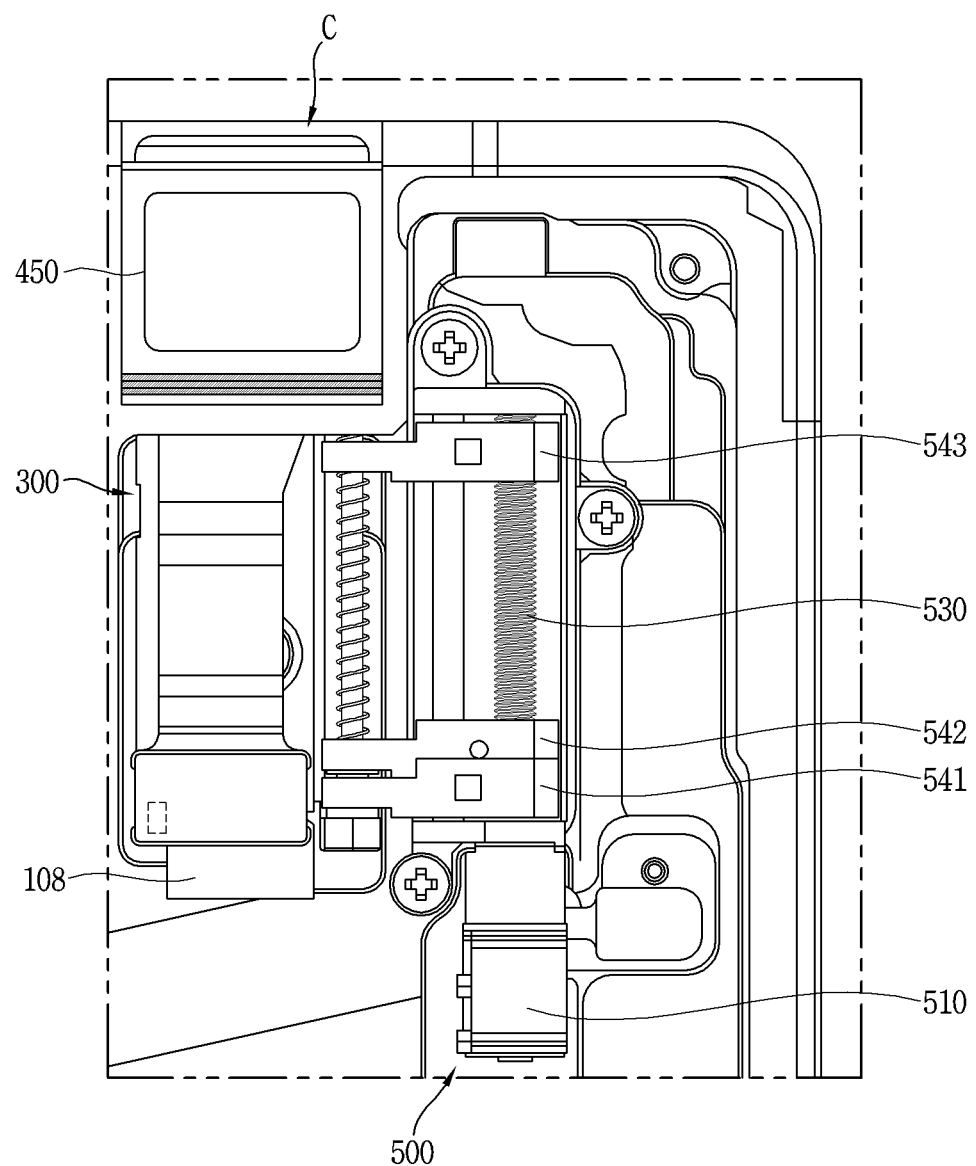
FIGS. 6A and 6B are conceptual views illustrating locations (postures) of the pop-up camera when the pop-up camera is disposed in a first state and a second state, respectively, after removing a rear cover.
Figure 6B:
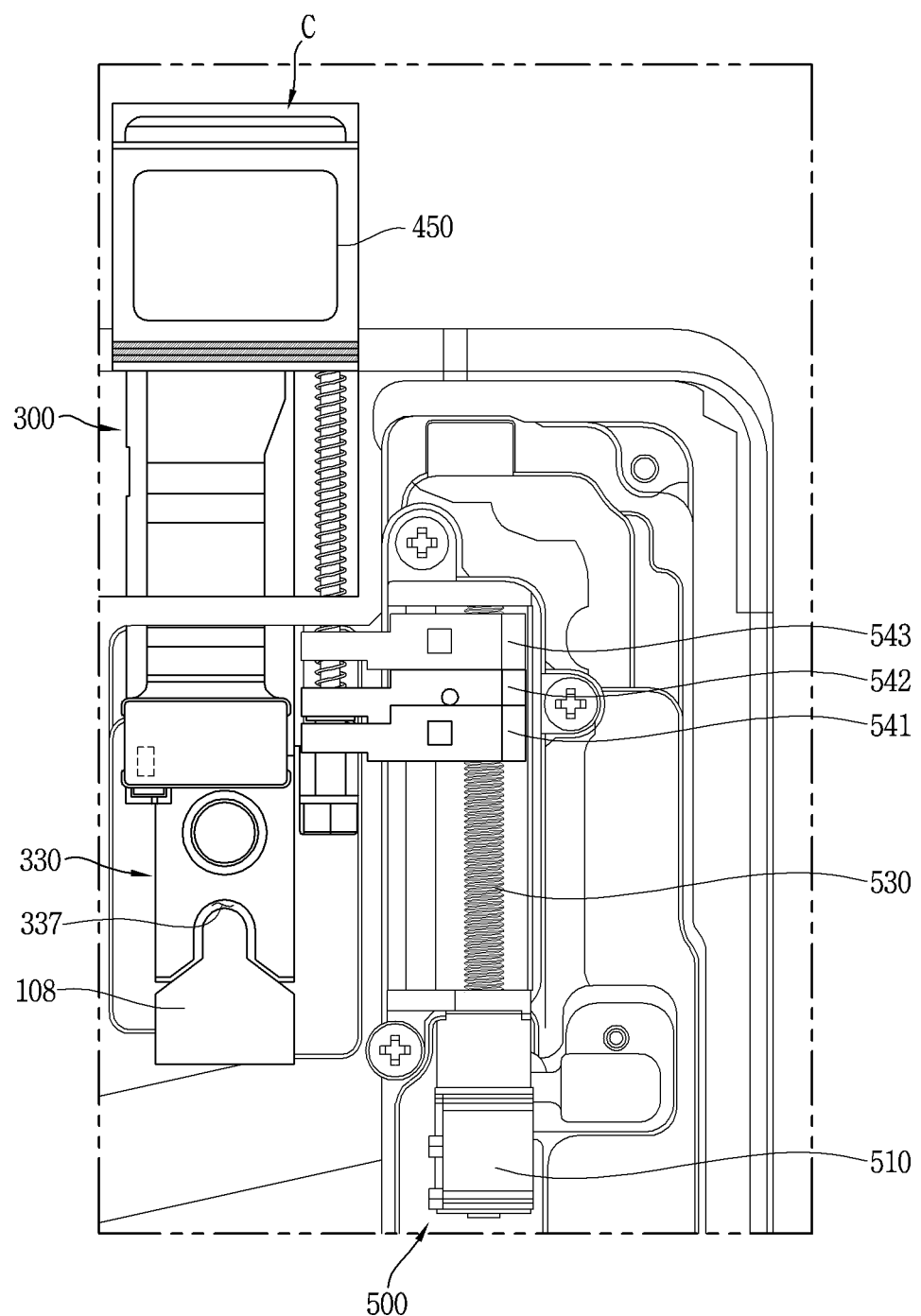
Figure 8:
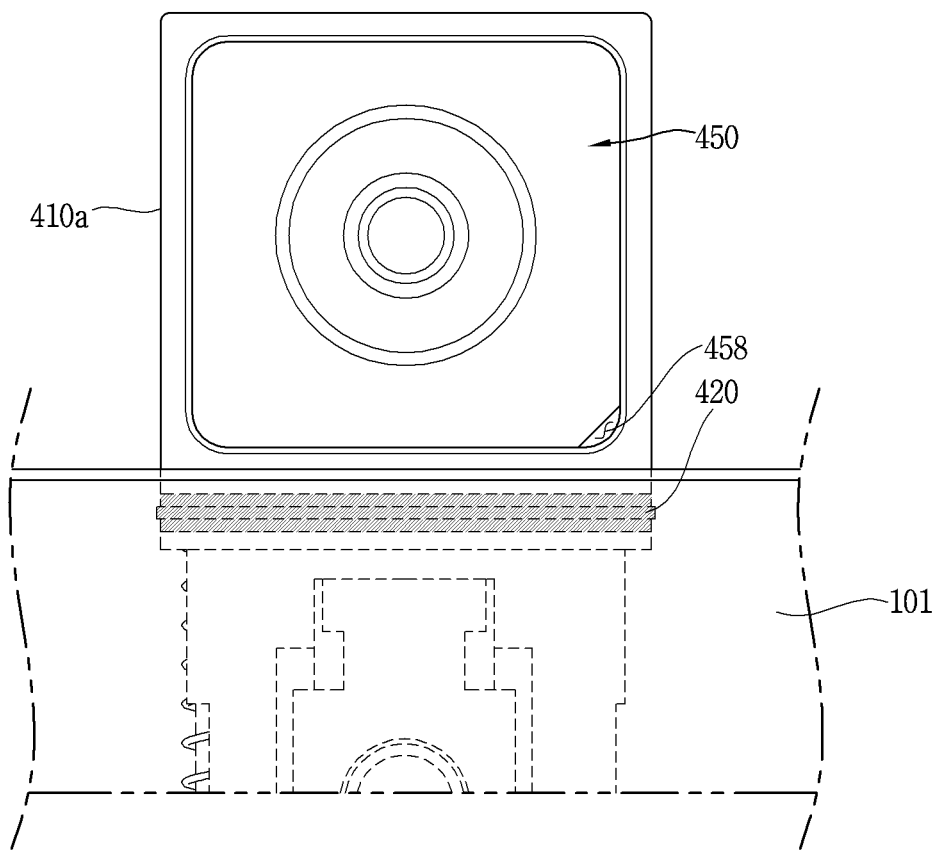
FIG. 8 is a conceptual view illustrating the state of (b) of FIG. 7, viewed from the front.

FIGS. 6A and 6B are conceptual views illustrating locations (postures) of the pop-up camera C when the pop-up camera C is disposed in a first state and a second state, respectively, after removing the rear cover 103. FIG. 7 is a conceptual view illustrating the states in which the pop-up camera C according to FIGS. 6A and 6B is disposed in the display device. FIG. 8 is a conceptual view illustrating the state of (b) of FIG. 7, viewed from the front.

Referring first to FIG. 6A, the pop-up camera C is disposed in a first state in which it is disposed inside the display device. Also, the first moving rod 541 may be disposed between the bushing 352 and the support protrusion 355c of the pin (see FIG. 4). The second moving rod 542 may be disposed between the support protrusion 355c of the pin and the spring 351.

As the motor 510 of the motor assembly 500 is driven, the first moving rod 541 is moved upward. Accordingly, the first moving rod 541 pushes up an upper end of the bushing 352. Also, as the busing 352 is moved upward, the second moving rod 542 is also moved up together with the busing 352, so as to press the spring 351 upward.

Referring to FIG. 6B, it can be seen that the bushing 352 is moved up by the first moving rod 541. However, as the bushing 352 is moved upward, the spring 351 presses the rail body 305 and the head assembly 400. Accordingly, the entire spring assembly 350 can move upward.

In addition, the spring 351 is moved up by the second moving rod 542. The spring 351 presses the rail body 305 and the housing 410 upward. Accordingly, a second state in which the pop-up camera C protrudes to the outside of the display device can be achieved.

Refer to FIG. 6B, as described above, the fixing groove 337 is recessed in the bracket 330 to be narrowed in width. Also, the connection member 108 is disposed on the front case 101 and protrudes in one direction. The bracket 330 may be fixedly coupled to the case of the display device by the connection member 108 fitted into the fixing groove 337. However, unlike the structure illustrated, the connection member 108 may alternatively be mounted to the rear cover 103 or the rear case 102.

The connection member 108 may be formed to correspond to the shape of the fixing groove 337 of the bracket 330. As the bracket 330 is fitted into the connection member 108, the bracket 330 can be restricted from rotating to left and right, twisting, or moving up and down while the rail body 305 moves. Accordingly, the rail assembly 300 that is moved up and down by the motor assembly 500 can be stably moved up and down.

According to one embodiment of the present disclosure, although the rail assembly 300 and the bracket 330 are configured as the different modules from each other, the bracket 330 can be firmly fixed to the display device and the rail assembly 300 can be stably coupled to the bracket 330. This is advantageous in that relative switching of the pop-up camera C from the first state to the second state can be stably made.

According to one embodiment of the present disclosure, even though each component is configured as a different module, there may be no significant difference in coupling or robustness (rigidity) compared to a structure in which one module is moved. In addition, since several modules are employed, each module can be easily manufactured. Simple design of each module can reduce the rate of defects that may occur during manufacturing.

That is, in the case of manufacturing a complex shape in which each module is combined, if a defect occurs in a partial area, all the modules may be defective. On the other hand, when each module is separately manufactured, its shape can be relatively simplified and only a defective module can be replaced if a defect occurs in the corresponding module, which can reduce an overall defect rate.

In addition, according to one embodiment of the present disclosure, since the spring 351 of the spring assembly 350 has been pushed up in the second state, when the pop-up camera C receives an external impact in the second state, the impact can be attenuated by the spring 351 of the spring assembly 350. By virtue of the impact attenuation, breakage of the motor assembly 500 or the rail assembly 300 due to the external impact applied when the pop-up camera C is in the second state can be effectively prevented.

Referring to (a) of FIG. 7, the pop-up camera C is disposed in the first state, and referring to (b) of FIG. 7, the pop-up camera C is disposed in the second state. At this time, the camera 212 faces a direction FD that the front case 101 faces.

The sealing member 420 may be disposed between the housing 410 and the case of the display device so that a lower area of the sealing member 420 is blocked from an outer area of the display device.

The housing 410 is received inside the display device in the first state in which the rail assembly 300 is moved downward, while protruding to the outside of the display device in the second state in which the rail assembly 300 is moved upward.

In the second state, the sealing member 420 may be located within the case of the display device such that the outer space of the display device and the lower area of the housing 410 are blocked from each other. Accordingly, the sealing member 420 fills a gap 101g between the front case 101 and the pop-up camera C and a gap 103g between the rear cover 103 and the pop-up camera C so as to prevent the upper and lower parts thereof from communicating with each other.

Meanwhile, referring to FIG. 8, a detachment groove 458 may be formed in one end portion of the decoration part 450. The detachment groove 458 may be used to detach the decoration part 450 from the housing 410. Specifically, a member for detachment may be inserted into the detachment groove 458 to press the decoration part 450 in a direction opposite to an attachment direction. Through this, the decoration part 450 can be detached from the housing 410. This can facilitate the detachment of the decoration part 450 when the decoration part 450 has been damaged or internal components have been damaged.

FIG. 9 is a conceptual view illustrating that the bracket 330 and the rail body 305 of the pop-up camera C according to one embodiment of the present disclosure are coupled to each other. FIGS. 10A to 10F are conceptual views illustrating processes of assembling the rail assembly 300 of the pop-up camera C and operations of driving the rail assembly 300 according to one embodiment of the present disclosure.

Hereinafter, the process of assembling each module constituting the pop-up camera C and the operation of driving each module will be described.

Referring to FIGS. 9 and 10A, the bracket 330 may include the first plate 332, and the second plate 334 spaced apart from the first plate 332. The guide grooves 335 that are concavely recessed may be formed between the first plate 332 and the second plate 334.

In this case, the first plate 332 and the second plate 334 may be disposed in parallel to each other. In addition, unlike the above description, the first plate 332 and the second plate 334 may be configured as a single plate, and the guide grooves 335 may be formed long in both sides of the single plate along a longitudinal direction of the bracket 330.

The insertion grooves 334a may be formed in an upper end of the second plate 334. The insertion grooves 334a may be recessed inwardly so that the first protrusion 321p and the second protrusion 322p of the rail body 305 can be inserted. The first protrusion 321p and the second protrusion 322p of the rail body 305 may be fitted into the guide grooves 335 through the insertion grooves 334a.

Figure 10B:
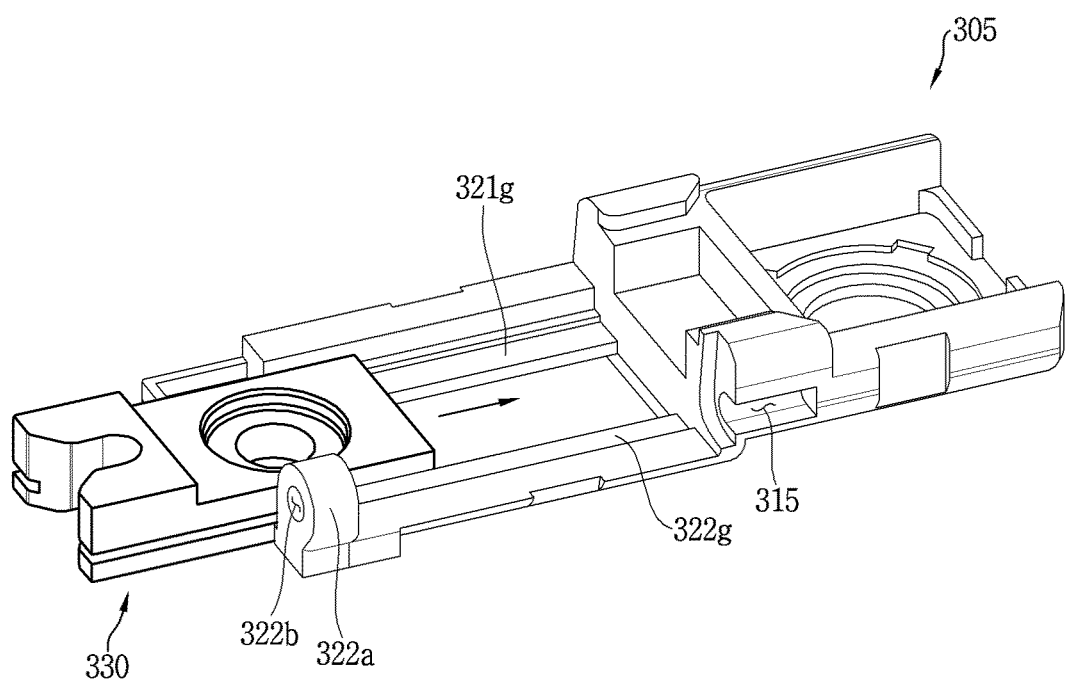
Figure 10C:
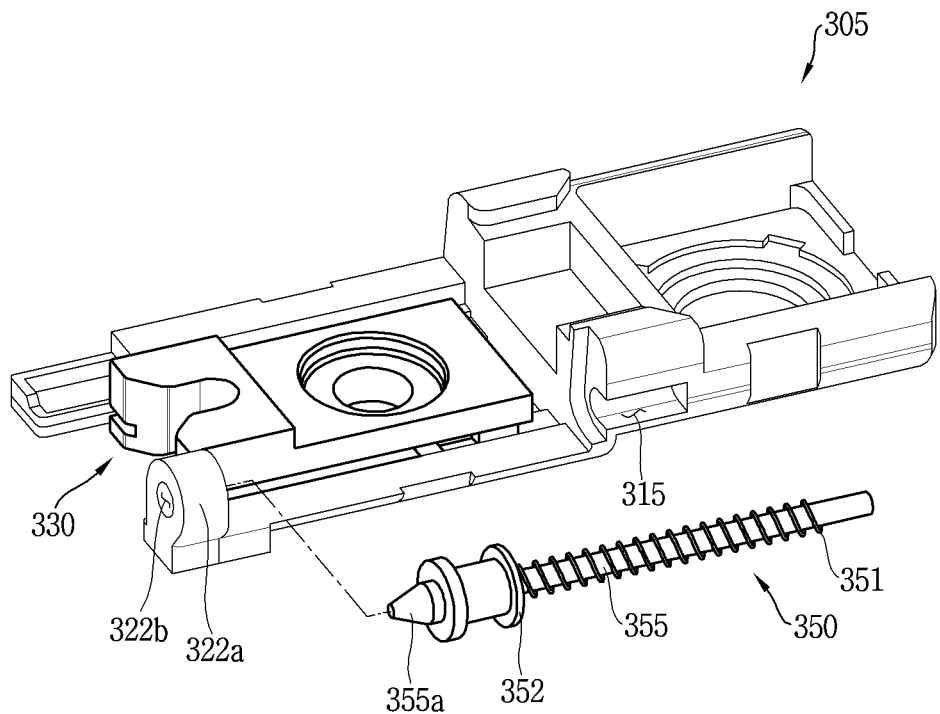

Referring to FIG. 10B, when the first protrusion 321p and the second protrusion 322p of the rail body 305 are inserted into the guide grooves 335 of the bracket 330, the first guide rail 321g and the second guide rail 322g may relatively move along the guide grooves 335 of the bracket 330, and the rail body 305 and the bracket 330 may move in a direction to be coupled to each other.

Figure 10D:
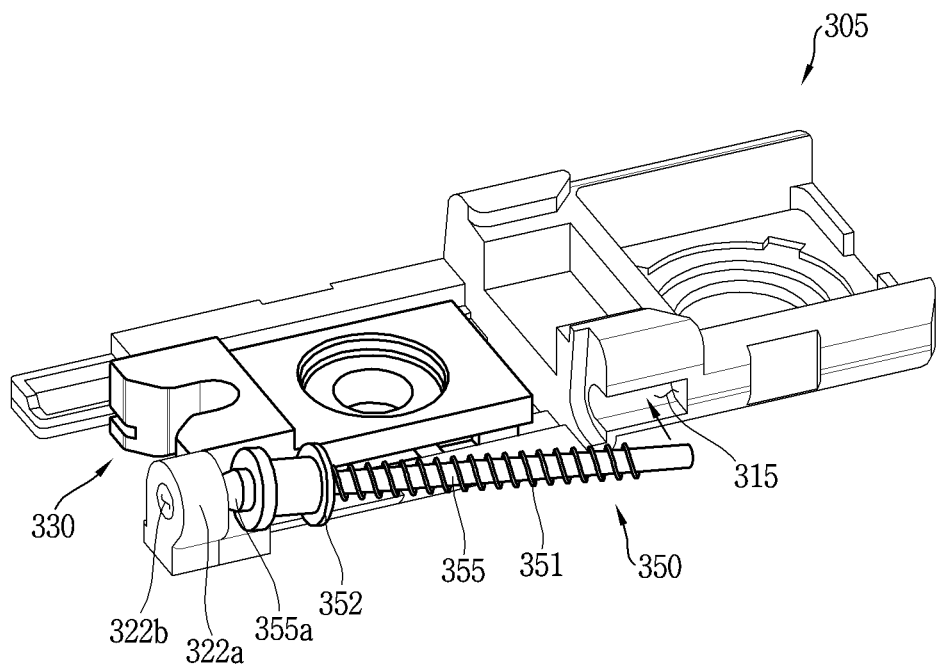

Referring to FIGS. 100 and 10D, the bushing 352 is inserted into the pin body 355b such that the spring assembly 350 is supported by the support protrusion 355c formed adjacent to the one end 355a of the pin, the spring 351 is inserted into the pin body 355b to be supported by the bushing 352.

Also, the spring assembly 350 may be coupled to the rail body 305 in a manner that the one end 355a of the pin is inserted into the insertion hole 322b and another end of the pin is inserted into the inlet groove 315. Specifically, referring to FIG. 100, the one end 355a of the pin of the spring assembly 350 is inserted into the insertion hole 322b of the rail body 305. Referring to FIG. 10D, the another end of the pin having the one end which has been inserted into the insertion hole 322b of the rail body 305 is inserted into the inlet groove 315.

At this time, a diameter of the spring 351 is larger than that of the inlet groove 315. Accordingly, the another end of the pin may be inserted into the inlet groove 315 in a state in which a length of the spring 351 is reduced by compressing the spring 351. Accordingly, since the spring 351 is compressed, the lower end of the first body 310 can be pressed.

Figure 10E:
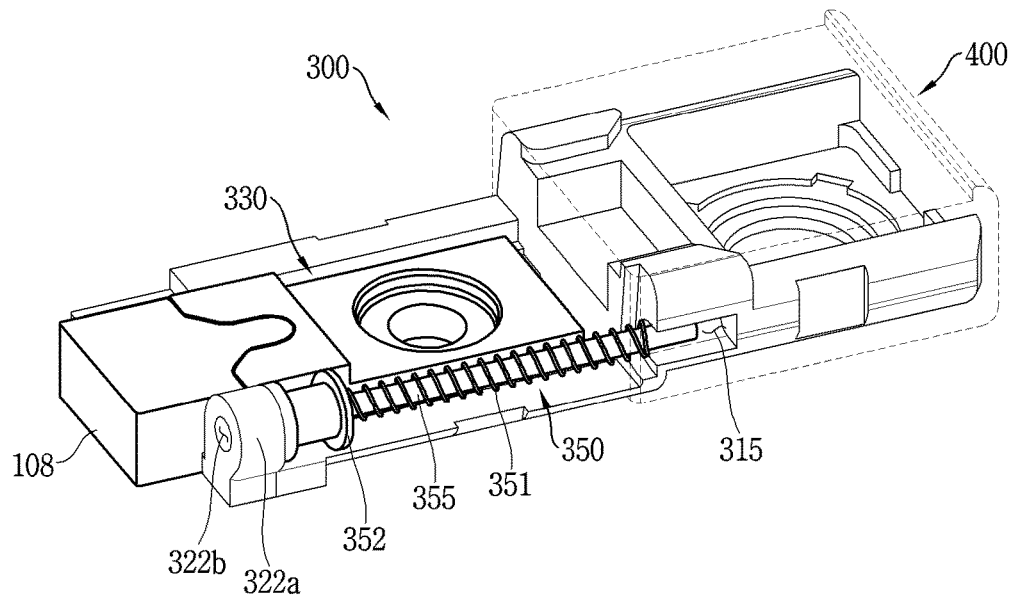

Next, referring to FIG. 10E, the head assembly 400 may cover the first body 310 of the rail body 305 in a state where the spring assembly 350 is inserted into the first body 310.

At this time, the head assembly 400 can cover the upper end of the first body 310 in the state where the spring assembly 350 is inserted into the first body 310, such that the spring assembly 350 and the first body 310 can be coupled to each other not to be separated from each other.

In the coupled state of the rail body 305, the bracket 330, the housing 410, and the spring assembly 350, the bracket 330 may be coupled by being connected with the connection member 108 that is fixed to the case of the display device.

Figure 10F:
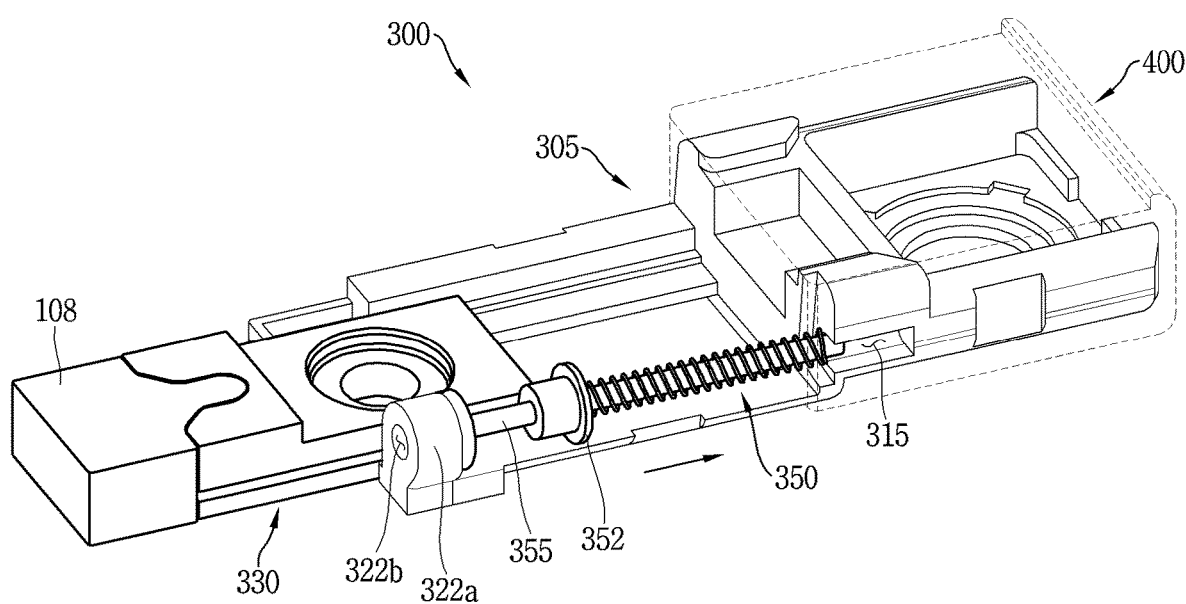

Referring to FIG. 10F, when driven by an electrical signal, the motor assembly 500 allows the rail body 305 to move up and down, so that the rail body 305 can move relative to the bracket 330. As described above, since the bracket 330 is fixed to the case of the display device, the rail body 305 can move upward while moving relative to the bracket 330. Accordingly, the pop-up camera C can be driven in the second state.

On the other hand, it is preferable that the fixing groove 337 and the insertion grooves 334a of the bracket 330 are formed on opposite sides of each other. This is because the fixing groove 337 and the insertion grooves 334a have different purposes. Specifically, the fixing groove 337 is a configuration for fixing and coupling the bracket 330 to the inside of the display device. In addition, the insertion grooves 334a are formed such that the first guide rail 321g and the second guide rail 322g of the rail body 305 are inserted into the guide grooves 335 of the bracket 330 to be reciprocally movable along the guide grooves 335. Therefore, it is preferable that the fixing groove 337 and the insertion grooves 334a of the bracket 300 are formed on the opposite sides of each other.

According to one embodiment of the present disclosure, in order to transmit driving force of the motor 510 to the rail body 305, a simple fitting structure may be applied to the pin of the spring assembly 350, such that power can be transmitted through a very simple structure. This is realized as the pop-up camera C is modularized into the rail body 305, the bracket 330, the spring assembly 350, and the housing 410, and provides an advantage that the pop-up camera C can be assembled quickly and easily through such modularization and simple assembling structure.

Figure 11:
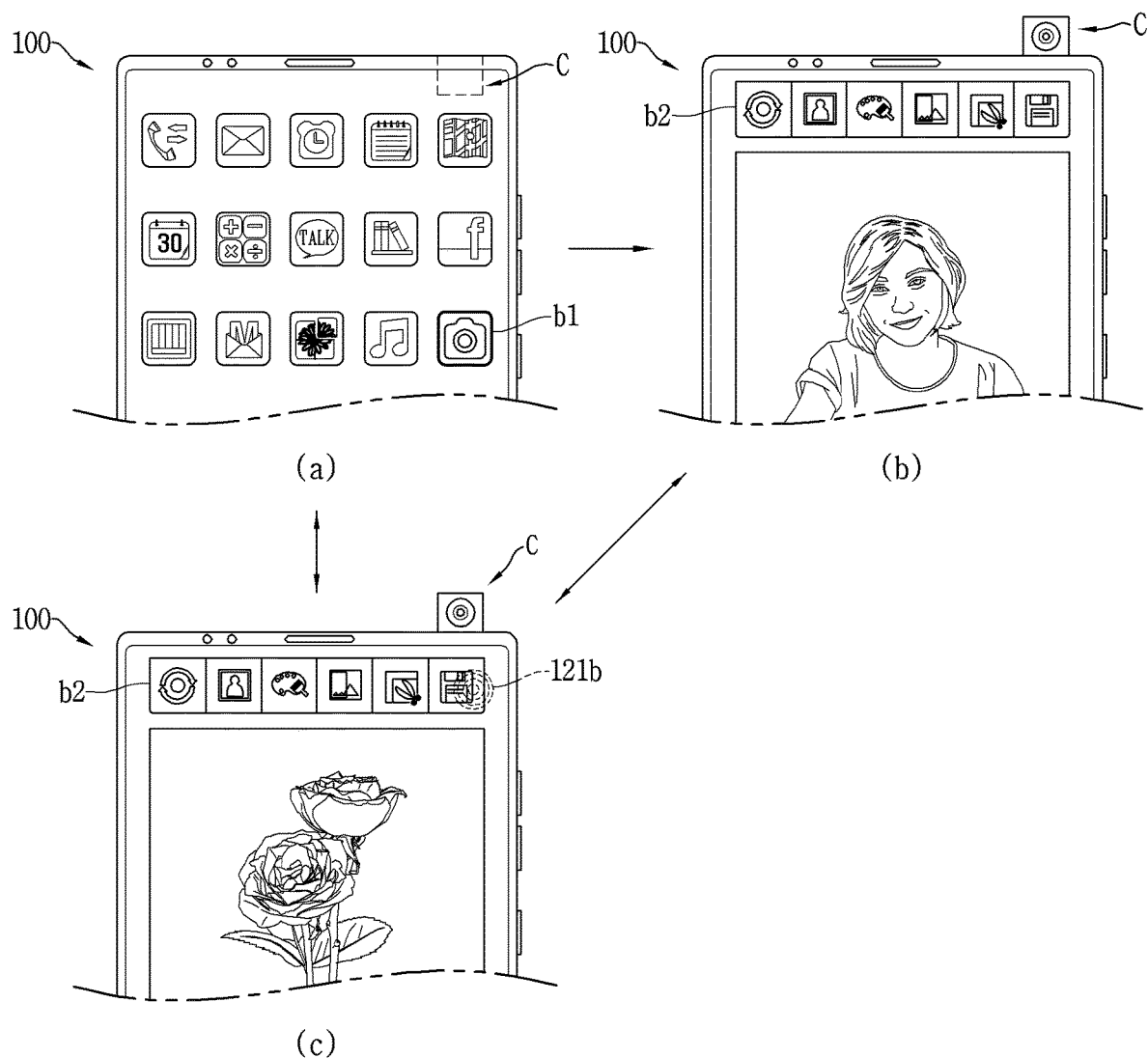
FIG. 11 is a view illustrating that a pop-up camera is driven in association with a camera application in a display device in accordance with one embodiment of the present disclosure.

FIG. 11 is a view illustrating that the pop-up camera C is driven in association with a camera application in the display device in accordance with the one embodiment of the present disclosure.

The pop-up camera C may protrude to the outside by an electrical signal as the camera application is executed or may be drawn into the interior by an electrical signal as the camera application is terminated.

Specifically, referring to (a) of FIG. 11, while a general screen of the display device is being executed, the pop-up camera C may be disposed in the first state in which the pop-up camera C is located inside the display device.

However, when the camera application b1 is executed or an application which requires the operation of the camera 212 facing the front of the display device is executed, the pop-up camera C may be disposed in the second state in which the pop-up camera C protrudes to the outside of the display device, as illustrated in (b) of FIG. 11.

Furthermore, when it is necessary to activate the camera 212 facing the front of the display device, for example, when it is necessary to activate the camera 212 for taking a selfie, the pop-up camera C may be driven to face a direction toward the front.

Next, as illustrated in (b) of FIG. 11, when the user presses a button for switching to the rear camera 121b of the display device while the pop-up camera C is capturing the front of the display device in the second state, the rear camera 121b that is located on the rear surface of the display device and faces the rear of the display device may be driven by the corresponding application.

Even when the rear camera 121b is driven, the pop-up camera C may be maintained in the second state. This is because the user can switch the camera 212 from the rear camera 121b to the pop-up camera C. When the rear camera 121b is activated, camera setting may also be changed such that the pop-up camera C is switched to the first state.

On the other hand, as illustrated in (b) and (c) of FIG. 11, in the state where the pop-up camera C protrudes from the display device 100, when a strong external impact is applied to the pop-up camera C, for example, due to the user dropping the display device 100, the pop-up camera C may be drawn into the display device 100 according to a sensing result that is obtained from a sensor disposed inside the display device 100.

For example, when the user drops the display device 100, a free fall of the display device 100 may be sensed by the sensor disposed inside the display device 100. At this time, when the pop-up camera C has protruded to the outside, the controller may generate a signal to allow the pop-up camera C to be drawn into the display device, thereby preventing damage to the pop-up camera C.

In addition, when the pop-up camera C receives an external force of a predetermined level or larger while the pop-up camera C protrudes to the outside of the display device 100, this external force may be detected by a sensor disposed inside the pop-up camera C and the pop-up camera C may be drawn into the display device 100. For example, when the user applies force in a direction of inserting the pop-up camera C into the display device or when the pop-up camera C is pressed in the direction toward the inside of the display device due to an impact (collision) with an external object, the pop-up camera C may be drawn into the display device by the sensor disposed inside the pop-up camera C.

Figure 12:
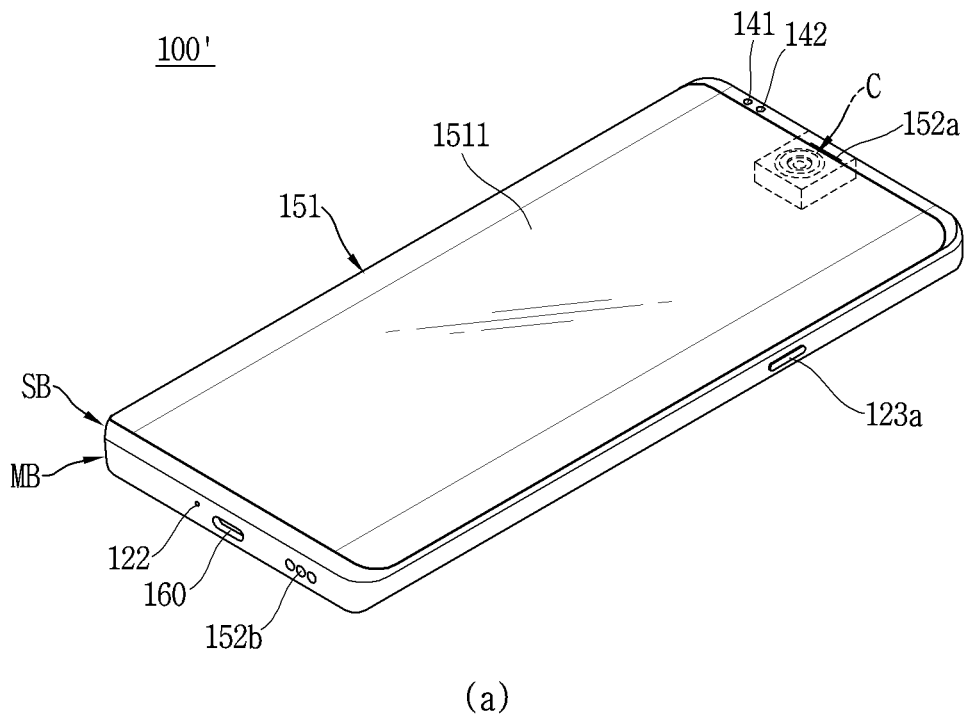
FIG. 12 is a conceptual view illustrating a display device according to another embodiment of the present disclosure, viewed from different directions.
Figure 12:
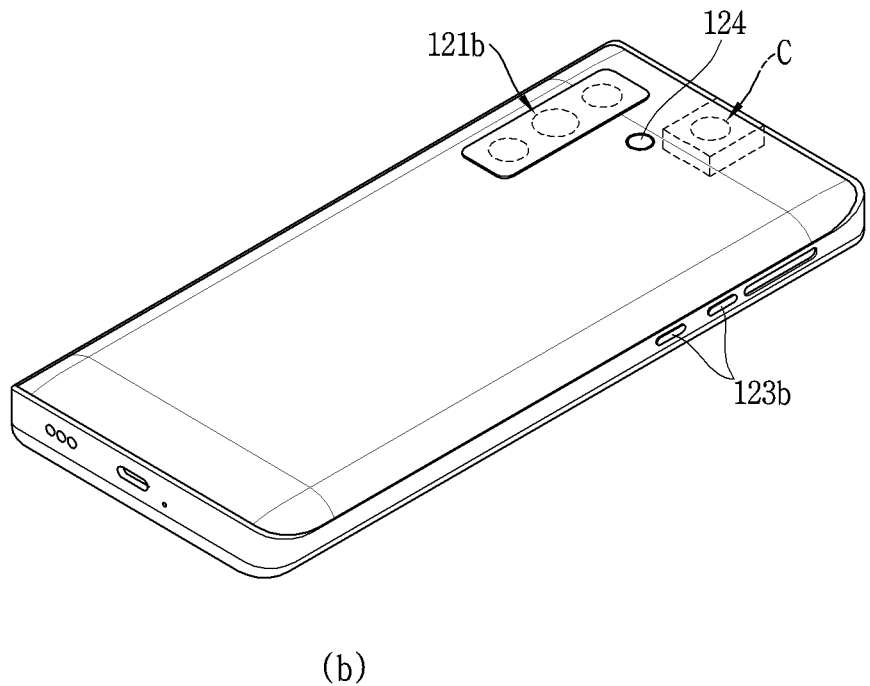
Figure 13:
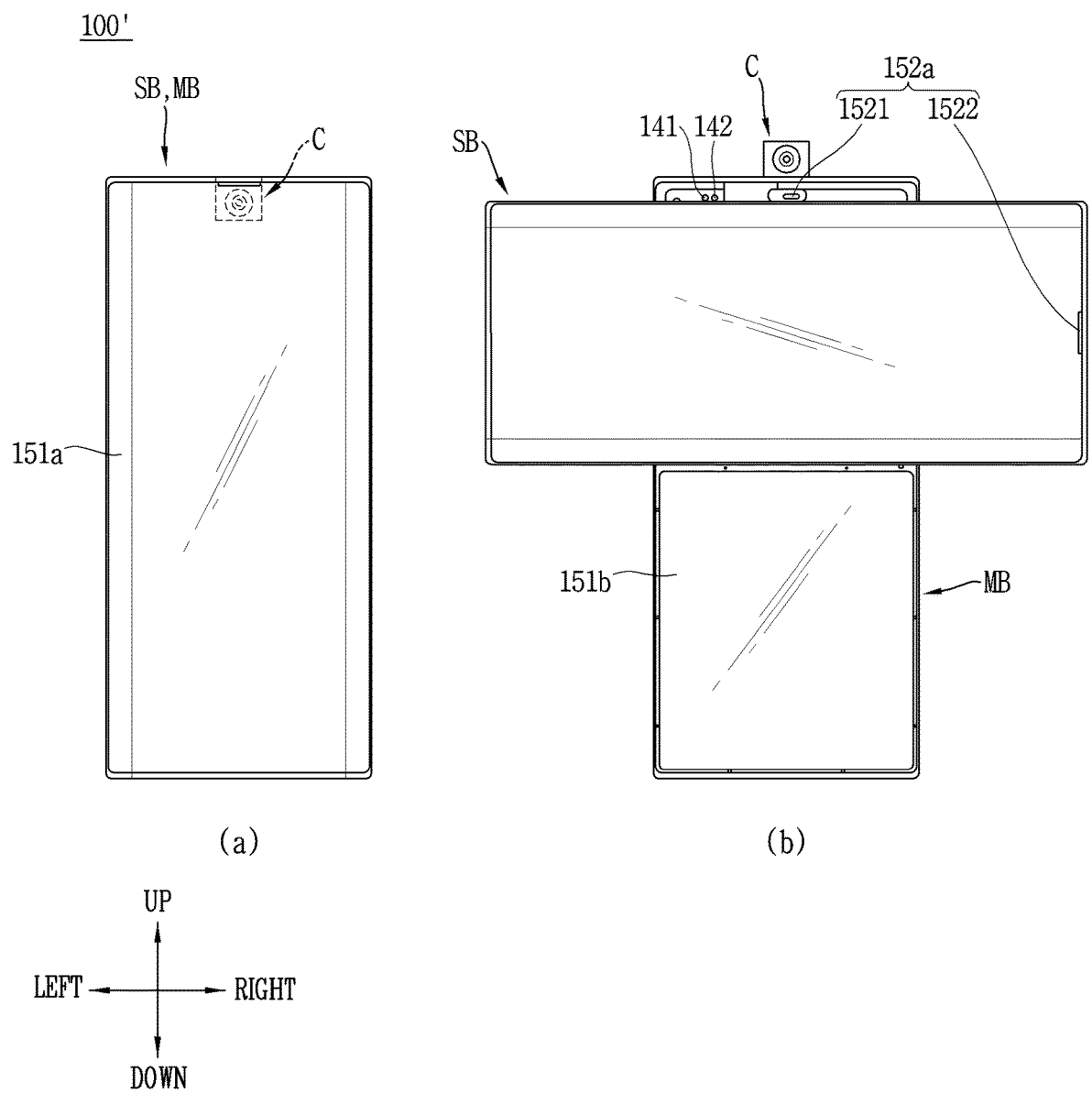
FIG. 13 is a conceptual view illustrating states before and after performing a swivel rotation of the display device of FIG. 12.

FIG. 12 is a conceptual view illustrating a display device according to another embodiment of the present disclosure, viewed from different directions. FIG. 13 is a conceptual view illustrating states before and after performing a swivel rotation of the display device of FIG. 12.

Compared to the display device illustrated in FIG. 2, a display device 100' illustrated in FIG. 12 has the same/like components, excluding that it includes a swivel body SB and a main body MB, and the swivel body SB is rotatable relative to the main body MB. Thus, the description of the same/like configuration is omitted.

(a) and (b) of FIG. 12 are conceptual views illustrating one example of a display device 100' related to the present disclosure, viewed from different directions, and (a) and (b) of FIG. 13 illustrate states before and after rotating the swivel body SB of the display device 100'.

The display device 100' includes a terminal body that is rotatable. However, the present disclosure may be applied to various structures within a range that does not contradict the characteristics to be described below.

Here, considering the display device 100' as at least one assembly, the terminal body may be understood as a conception referring to the assembly.

The display device 100' may include two bodies SB and MB that are overlaid on each other. The two bodies SB and MB have displays 151a and 151b, respectively, and are rotatable relative to each other. A body disposed on the front is defined as the swivel body SB and a body disposed on the rear is defined as the main body MB. A display mounted on the swivel body SB is defined as a first screen 151a and a display mounted on the main body MB is defined as a second screen 151b.

Each of the bodies SB and MB may include a front case and a rear case. Various electronic components are disposed in an inner space defined by the combination of the front case and the rear case. At least one middle case may be additionally positioned between the front case and the rear case.

The display unit 151 is located on a front surface of each body SB, MB to output information. As illustrated, a window 1511 of the display unit 151 may be mounted to the front case to define the front surface of the terminal body together with the front case.

Electronic components may also be mounted on the rear case of the main body MB. Examples of those electronic components mounted to the rear case 102 may include a detachable battery, an identification module, a memory card, and the like. In this case, a rear cover may be detachably disposed to cover the electronic components mounted to the rear case. Therefore, when the rear cover is detached from the rear case, those electronic components mounted on the rear case are exposed to the outside.

When the rear cover is attached to the rear case, a portion of a side surface of the rear case may be exposed. In some cases, upon the coupling, the rear case may also be completely shielded by the rear cover. Meanwhile, the rear cover may have openings for exposing the camera 121b or a light output module, the flash 124, the first manipulation unit 123a, and the like, to the outside.

The cases may be formed by injection-molding synthetic resin or may be formed of a metal, for example, stainless steel (STS), aluminum (Al), titanium (Ti), or the like.

As an alternative to the example in which the plurality of cases define an inner space for accommodating various electronic components, the display device 100' may be configured such that one case defines the inner space. In this case, the display device 100' having a uni-body is formed in a manner that synthetic resin or metal extends from a side surface to a rear surface.

Meanwhile, the display device 100' may include a waterproofing unit (not illustrated) for preventing penetration of water into the terminal body. For example, the waterproofing unit may include a waterproofing member which is located between the window 1511 and the front case, between the front case and the rear case, or between the rear case and the rear cover to hermetically seal an inner space defined when those cases are coupled.

The display device 100' may include a display unit 151, first and second audio output module 152a and 152b, a proximity sensor 141, an illumination sensor 142, an optical output module 154, a pop-up camera C, a rear camera 121b, first and second manipulation units 123a and 123b, a microphone 122, an interface unit 160, and the like.

The display unit 151 is generally configured to output information processed in the display device 100'. For example, the display unit 151 may display execution screen information of an application program executing at the display device 100' or user interface (UI) and graphic user interface (GUI) information in response to the execution screen information.

The display unit 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be provided by two in number depending on configuration of the display device 100'. For instance, a plurality of the display units may be arranged on one surface of the display device 100' to be either spaced apart from each other or to be integral with each other, or may be disposed on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 1511 and a display (not illustrated) on a rear surface of the window, or may be a metal wire directly patterned on the rear surface of the window 1511. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1). In some cases, the touch screen may replace at least some of functions of the manipulation units 123*a* and 123*b*.

The first audio output module 152*a* may be implemented as a receiver for transmitting a call sound to a user's ear and the second audio output module 152*b* may be implemented as a loud speaker for outputting various alarm sounds or multimedia reproduction request sounds.

The window 1511 of the display unit 151 may include sound holes for emitting sounds generated from the first audio output module 152*a*. However, the present disclosure is not limited thereto, and the sounds may be released along an assembly gap between the structural bodies (for example, a gap between the window 1511 and the front case). In this case, a hole independently formed to output audio sounds may not be seen or may otherwise be hidden in terms of appearance, thereby further simplifying the appearance of the display device 100'.

The optical output module may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module to stop the light output.

The pop-up camera C may be provided on the main body MB. As illustrated in FIGS. 12 and 13, the pop-up camera C may be configured to be selectively exposed only when driven. Specifically, the pop-up camera C may protrude from inside to outside of the main body MB when a specific button is pressed, when a specific application is activated, or by a specific signal or a signal generated from a specific sensor. The pop-up camera C can be efficiently arranged by being disposed in the main body MB with a relatively large space.

The pop-up camera C may process image frames such as still or moving images obtained by the image sensor in a capture mode or a video call mode. The processed image frames can then be displayed on the display unit 151 or stored in the memory 170.

The manipulation units 123*a* and 123*b* are examples of the user input unit 123, which may be manipulated by a user to provide input to the display device 100'. The manipulation units 123*a* and 123*b* may also be commonly referred to as a manipulating portion. The manipulation units 123*a* and 123*b* may employ any method if it is a tactile manner allowing the user to perform manipulation with a tactile feeling such as touch, push, scroll or the like. The manipulation units 123*a* and 123*b* may also be manipulated through a proximity touch, a hovering touch, and the like, without a user's tactile feeling.

For example, the manipulation units 123*a* and 123*b* may be configured with a mechanical key, or a combination of a touch key and a push key. In addition, the manipulation units 123*a* and 123*b* may be configured in a layered form with the fingerprint sensor.

The content received by the manipulation units 123*a* and 123*b* may be set in various ways. For example, the manipulation units 123*a* and 123*b* may be used by the user to input a command such as menu, home key, cancel, search, or the like, and to input a command, such as controlling a volume level being output from the first or second audio output module 152*a* or 152*b*, switching into a touch recognition mode of the display unit 151, or the like.

On the other hand, as another example of the user input unit 123, the first manipulation unit 123*a* may be disposed on a side surface of the terminal body. The first manipulation unit 123*a* may be manipulated by a user to input a command for controlling an operation of the display device 100'. Contents to be input may be set in various ways. For example, the first manipulation unit 123*a* may be used by the user to input a command, such as power on/off, start, end, scroll or the like, controlling a volume level being output from the first or second audio output module 152*a* or 152*b*, switching into a touch recognition mode of the display unit 151, or the like. The first manipulation unit 123*a* may be implemented into a form allowing a touch input, a push input or a combination thereof.

On the other hand, the display device 100' may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the display device 100' to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the display device 100'. The interface unit 160 may be implemented in the form of a socket for accommodating an external card, such as Subscriber Identification Module (SIM), User Identity Module (UIM), or a memory card for information storage.

The rear camera 121*b* may be further mounted to the rear surface of the terminal body. The rear camera 121*b* may have an image capturing direction, which is substantially opposite to the direction of the pop-up camera C.

The rear camera 121*b* may include a plurality of lenses arranged along at least one line. The plurality of lenses may be arranged in a matrix form. The cameras may be referred to as an 'array camera.' When the rear camera 121*b* is implemented as the array camera, images may be captured in various manners using the plurality of lenses and images with better qualities may be obtained.

The flash 124 may be disposed adjacent to the rear camera 121*b*. When an image of a subject is captured with the rear camera 121*b*, the flash 124 may illuminate the subject.

The second audio output module 152*b* may further be disposed on the terminal body. The second audio output module 152*b* may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or disposed on the case. For example, an antenna which configures a part of the broadcast receiving module 111 (see FIG. 1) may be retractable into the terminal body. Alternatively, an antenna may be formed in a form of film to be attached onto an inner surface of the rear cover or a case including a conductive material may serve as an antenna.

The terminal body is provided with a power supply unit 190 (see FIG. 1) for supplying power to the display device 100'. The power supply unit 190 may include a batter which is mounted in the terminal body or detachably coupled to an outside of the terminal body.

The battery may receive power via a power cable connected to the interface unit 160. Furthermore, the battery may be (re)chargeable in a wireless manner using a wireless charger. The wireless charging may be implemented by magnetic induction or electromagnetic resonance.

On the other hand, in this drawing, the configuration that the rear case is coupled to the rear case to cover the battery so as to suppress separation of the battery and to protect the battery from external impact and foreign substances. When the battery is configured to be detachable from the terminal body, the rear cover may be detachably coupled to the rear case.

Based on the front of the display device 100', the swivel body SB and the main body MB may have shapes corresponding to each other. In particular, the swivel body SB and the main body MB may have a bar-shaped appearance as a whole and a rectangular shape with respect to the front. In this case, the rectangle means a substantial rectangle. A direction parallel to long edges of the rectangle is defined as a lengthwise direction of each body SB, MB, and a direction parallel to short edges is defined as a widthwise direction of each body SB, MB.

The swivel body SB is provided to be rotatable relative to the main body MB. The swivel body SB rotates with being in parallel to the main body MB, that is, it rotates with one axis in a thickness direction (front and rear direction) of the display device 100' as a rotational axis.

Based on the front, a state in which the rectangular swivel body SB has rotated to overlap (hide) the main body MB in the same direction as the main body MB is defined as a 'closed state', while a state in which the swivel body SB has rotated to be located perpendicular to the main body MB is defined as an 'open state'.

A rotation angle of the swivel body SB between the closed state and the open state may be 90°.

In the case of the embodiment, the open state refers to a state in which the swivel body SB has rotated clockwise based on the closed state, but may also refer to a state in which the swivel body SB has rotated counterclockwise.

The first screen 151a of the swivel body SB is exposed to the front in both the closed and open states, while the second screen 151b of the main body MB is exposed to the front only in the open state. In the process of switching from the closed state to the open state, an exposed area of the second screen 151b gradually increases and can be exposed to the maximum in the open state.

The first sound output module 152a, which is provided as a receiver for transmitting a call sound to the user's ear, is preferably provided at the same position (i.e., a position corresponding to the user's ear) in both the closed and open states of the display device 100'. To this end, the first sound output module 152a may include a first receiver hole 1521 and a second receiver hole 1522. Waves of sound are generated in a speaker module at a point on a rear surface of the first receiver hole 1521 among electronic parts of the display device 100'. Such waves of sound may be output sequentially through the first receiver hole 1521 and the second receiver hole 1522 in the closed state of the swivel body SB, while being output only through the first receiver hole 1521 in the open state of the swivel body SB.

The second receiver hole 1522 may be formed in a shape of a slit or a fine perforation hole, so that sound waves output through the first receiver hole 1521 can pass without being blocked when the swivel body SB is in the closed state.

In order to perform the same function even when the swivel body SB is in the open state, the proximity sensor 141 and the illuminance sensor 142 may also be provided on the main body MB.

The pop-up camera C may protrude from the main body MB when the swivel body SB is rotated.

That is, when the swivel body SB switches from the closed state as illustrated in (a) of FIG. 13 to the open state as illustrated in (b) of FIG. 13, the pop-up camera C may automatically protrude from the main body MB. However, the pop-up camera C may be set to protrude when there is an additional manipulation even when the swivel body SB switches from the closed state to the open state. That is, as illustrated in (a) of FIG. 13, the pop-up camera C may not protrude in the closed state of the swivel body SB.

However, the pop-up camera C may be manipulated to protrude from the main body MB by a specific manipulation or an execution of a specific application, even in the closed state of the swivel body SB. For example, when a camera application that is set to capture the front of the display device 100' is activated, the pop-up camera C may protrude from the main body MB.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the present disclosure, designs and control methods of a pop-up camera and a display device including the same can be implemented as computer-readable codes in a program-recorded medium.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A pop-up camera that is inserted into and protruding from a display device, the pop-up camera comprising:
  a camera module disposed so that a camera is directed toward one side;
  a rail assembly into which the camera module is inserted and which is formed to be movable up and down;
  a head assembly which is open in a direction in which the camera faces and is arranged to cover the camera module and one side of the rail assembly coupled to the camera module so that the camera module and the rail assembly are maintained in a coupled state; and
  a motor assembly driven in response to an electrical signal to move the rail assembly upward and downward,
  wherein the rail assembly comprises:
  a rail body including a first body having an opening open to the front and the camera of the camera module mounted thereon, and a second body extending downward from the first body and including rails formed on both sides; and
  a bracket fitted to the rails of the rail body and fixed to a case of the display device,
  wherein the motor assembly moves the rail body upward and downward when driven by an electrical signal, and the rail body moves relative to the bracket,
  wherein the second body comprises a first rail and a second rail that are spaced apart from each other on both sides thereof,
  wherein the bracket is fitted to the first rail and the second rail to guide the upward and downward movements of the rail body,
  wherein the bracket comprises:
  a first plate; and
  a second plate disposed to be spaced apart from the first plate,
  wherein guide grooves are formed between the first plate and the second plate,
  wherein a first protrusion and a second protrusion of the rail body are moved with being fitted into the guide grooves,
  wherein the first protrusion and the second protrusion protrude from lower ends of the first rail and the second rail, respectively, in directions facing each other,
  wherein insertion grooves are formed in an upper end of the second plate, and
  wherein the first protrusion and the second protrusion are inserted into the guide grooves through the insertion grooves.

2. The pop-up camera of claim 1, wherein the camera module comprises:
  the camera disposed to face the one side;
  a connection line having one end connected to the camera to transmit electrical signals received from the camera; and
  a connector connected to another end of the connection line to transmit the electrical signals to a controller, and
  wherein the connection line is formed long to absorb a change in a relative distance between the camera and the connector as the rail assembly moves up and down.

3. The pop-up camera of claim 2, wherein the camera module is configured such that the camera is exposed to outside of the case of the display device as the rail assembly moves upward, and inserted into the case of the display device as the rail assembly moves downward, and
  wherein the camera is disposed to face the front of the display device when exposed to the outside.

4. The pop-up camera of claim 1, wherein a fixing groove is recessed into the bracket to be narrowed in width, and
  wherein the bracket is fixedly coupled to the case of the display device by a connection member that is inserted into the fixing groove and fixed to the case of the display device.

5. The system of claim 1, wherein the rail assembly further comprises a spring assembly including a spring, a bushing supporting the spring, and a pin onto which the spring and the bushing are inserted,
  wherein a support portion protrudes from one end of the first rail, and has an insertion hole into which one end of the pin is inserted, and
  wherein an inlet groove into which another end of the pin is inserted is formed in the first body adjacent to the first rail.

6. The pop-up camera of claim 5, wherein the spring assembly is configured such that the bushing is inserted into a body of the pin to be supported by a support protrusion formed adjacent to the one end of the pin, and the spring is inserted into the body of the pin to be supported by the bushing, and
  wherein the spring assembly is coupled to the rail body in a manner that the one end of the pin is inserted into the insertion hole and the another end of the pin is inserted into the inlet groove.

7. The pop-up camera of claim 6, wherein the head assembly is formed to cover the first body of the rail body in a state in which the spring assembly is inserted in the first body.

8. The pop-up camera of claim 7, wherein the motor assembly moves the spring assembly up and down, and
  wherein the rail body is moved up and down as the spring presses the first body.

9. The pop-up camera of claim 1, further comprising:
  a housing open in a direction in which the camera of the camera module faces;
  a decoration part formed to cover the opening of the housing; and
  a sealing member inserted into a sealing groove formed in a lower end of the housing.

10. The pop-up camera of claim 9, wherein the sealing member is disposed between the housing and the case of the display device such that a lower area of the sealing member is blocked from an outer area of the display device.

11. The pop-up camera of claim 10, wherein the housing is received in the display device in a first state in which the rail assembly has moved downward, and
  protrudes to the outside of the display device in a second state in which the rail assembly has moved upward, and
  wherein the sealing member is located inside the case of the display device in the second state, so that an outer space of the display device and a lower area of the housing are separated from each other in the second state.

12. A display device comprising:
  a case including a front case and a rear case coupled to the front case to define an inner space;
  a pop-up camera disposed in the inner space; and
  a controller configured to drive the pop-up camera, wherein the pop-up camera comprises:

a camera module in which a camera is disposed in a direction that the front case faces;

a rail assembly into which the camera module is inserted, and which is configured to be movable up and down such that at least a portion of the camera module protrudes to outside of the case;

a head assembly which defines one appearance of the case, and is disposed to cover one side of the rail assembly so that the camera module and the rail assembly are maintained in a coupled state; and a motor assembly driven in response to an electrical signal to move the rail assembly upward and downward, wherein the rail assembly comprises:

a rail body including a first body having an opening open to the front and the camera of the camera module mounted thereon, and a second body extending downward from the first body and including rails formed on both sides; and a bracket fitted to the rails of the rail body and fixed to the case of the display device, wherein the motor assembly moves the rail body upward and downward when driven by an electrical signal, and the rail body moves relative to the bracket, wherein the second body comprises a first rail and a second rail that are spaced apart from each other on both sides thereof, wherein the bracket is fitted to the first rail and the second rail to guide the upward and downward movements of the rail body, wherein the bracket comprises:

a first plate; and a second plate disposed to be spaced apart from the first plate, wherein guide grooves are formed between the first plate and the second plate, wherein a first protrusion and a second protrusion of the rail body are moved with being fitted into the guide grooves, wherein the first protrusion and the second protrusion protrude from lower ends of the first rail and the second rail, respectively, in directions facing each other, wherein insertion grooves are formed in an upper end of the second plate, and wherein the first protrusion and the second protrusion are inserted into the guide grooves through the insertion grooves.

13. The display device of claim 12, wherein the pop-up camera is configured to protrude to the outside, in response to an electrical signal, as a camera application is executed, and to be inserted, in response to an electrical signal, as the camera application is terminated.

14. The display device of claim 12, wherein the case further comprises a connection member disposed on at least one of the front case or the rear case and protruding in one direction, wherein a fixing groove is recessed into the bracket to be narrowed in width, and wherein the bracket is fixed to the case as the connection member is coupled into the fixing groove.

* * * * *